United States Patent
Agaskar et al.

(10) Patent No.: US 12,136,428 B1
(45) Date of Patent: Nov. 5, 2024

(54) AUDIO WATERMARKING

(71) Applicant: Amazon Technologies, Inc., Seattle, WA (US)

(72) Inventors: Ameya Agaskar, Bedford, MA (US); Sumit Garg, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 17/490,271

(22) Filed: Sep. 30, 2021

Related U.S. Application Data

(60) Provisional application No. 63/241,270, filed on Sep. 7, 2021.

(51) Int. Cl.
*G10L 19/018* (2013.01)
*G10L 15/22* (2006.01)

(52) U.S. Cl.
CPC ............ *G10L 19/018* (2013.01); *G10L 15/22* (2013.01)

(58) Field of Classification Search
CPC .............................. G10L 19/018; G10L 15/22
See application file for complete search history.

(56) References Cited

U.S. PATENT DOCUMENTS 10,276,175 B1 * 4/2019 Garcia .................. G10L 19/018

OTHER PUBLICATIONS

Boney et al, Digital Watermarks for Audio Signals, IEE Proceedings of Multimedia '96, pp. 473-480 (Year: 1996).*
Pablo Cesar, et al., "Leveraging User Impact: An Architecture for Secondary Screens Usage in Interactive Television," Multimedia Systems, 2009, vol. 15, No. 3, pp. 127-142.
Yuan-Yen Tai , et al., "Audio Watermarking Over The Air With Modulated Self-Correlation," 2019 IEEE International Conference on Acoustics, Speech and Signal Processing (ICASSP); arXiv preprint arXiv:1903.08238, 2019, 5 pages.
Mohamed F. Mansour, et al. "Time-Scale Invariant Audio Data Embedding," in EURASIP Journal on Applied Signal Processing, 2003, pp. 993-1000.
Chi-Man Pun, et al., "Robust Segments Detector for De-Synchronization Resilient Audio Watermarking," IEEE Transactions on Audio, Speech, and Language Processing, vol. 21, No. 11, Nov. 2013, pp. 2412-2424.

(Continued)

*Primary Examiner* — Linda Wong
(74) *Attorney, Agent, or Firm* — Pierce Atwood LLP

(57) ABSTRACT

Described herein is a system for embedding audio watermarks. To improve performance without a user perceiving the audio watermark, a system embeds audio watermarks in audio data using scaling factors that are calculated based on a spectral masking level for each frame of the audio data. The scaling factors may vary over time and correspond to an amplitude of the audio watermark across a series of watermark frames. The system processes the audio data to determine a spectral mask, which represents an amount of energy perceived in a first frequency range that is caused by energy represented in neighboring frequency ranges. By selecting scaling factor values that keep an amplitude of the audio watermark below the threshold indicated by the spectral mask, the system may embed the audio watermark in the first audio data without the audio watermark being audible to the user.

20 Claims, 22 Drawing Sheets

(56) References Cited

OTHER PUBLICATIONS

Xiang-Yang Wang, et al., "A Novel Synchronization Invariant Audio Watermarking Scheme Based on DWT and DCT," IEEE Transactions on Signal Processing, vol. 54, No. 12, Dec. 2006, pp. 4835-4840.

Yong Xiang, et al., "Patchwork-Based Audio Watermarking Method Robust to De-Synchronization Attacks," IEEE/ACM Transactions on Audio, Speech, and Language Processing, vol. 22, No. 9, Sep. 2014, pp. 1413-1423.

Andrew Nadeau, et al., "An Audio Watermark Designed for Efficient and Robust Resynchronization After Analog Playback," IEEE Transactions on Information Forensics and Security, vol. 12, No. 6, Jun. 2017, pp. 1393-1405.

Giovanni Del Galdo, et al., "Audio Watermarking for Acoustic Propagation in Reverberant Environments," in 2011 IEEE International Conference on Acoustics, Speech and Signal Processing, pp. 2364-2367.

Xia. Zhang, et al., "An Audio Digital Watermarking Algorithm Transmitted via Air Channel in Double DCT Domain," in International Conference on Multimedia Technology, Jul. 2011, pp. 2926-2930. Retrieved from IEEE Xplore.

Mitchell D. Swanson et al., "Robust Audio Watermarking Using Perceptual Masking," Signal Processing, vol. 66, 1988, pp. 337-355.

P. Kabal, "An Examination and Interpretation of ITU-R BS. 1387: Perceptual Evaluation of Audio Quality," TSP Lab Technical Report, Dept. Electrical & Computer Engineering, McGill University, 2002, 96 pages.

Thilo Thiede, et al., "PEAQ—The ITU Standard for Objective Measurement of Perceived Audio Quality," Journal of the Audio Engineering Society, vol. 48, vol. ½, Jan./Feb. 2000, pp. 3-29. Retrieved from https://www.ee.columbia.edu/~dpwe/papers/Thiede00-PEAQ.pdf.

International Telecommunications Union, "Recommendation ITU-R BS.1387-1—Method for Objective Measurements of Perceived Audio Quality," 1998-2001, 100 pages. Retrieved from https://www.itu.int/dms_pubrec/itu-r/rec/bs/R-REC-BS.1387-1-200111-I!!PDF-E.pdf.

* cited by examiner

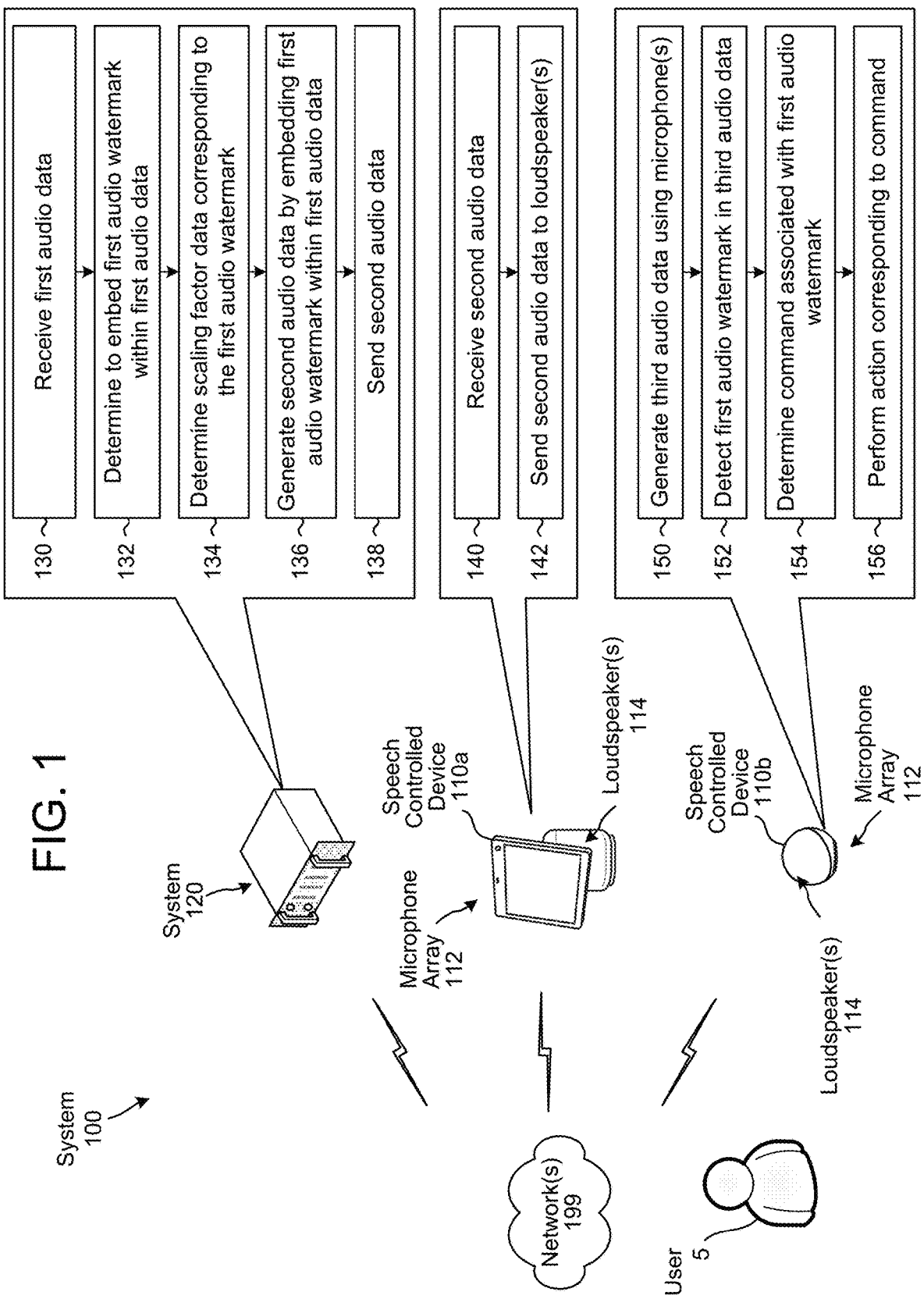

FIG. 2A
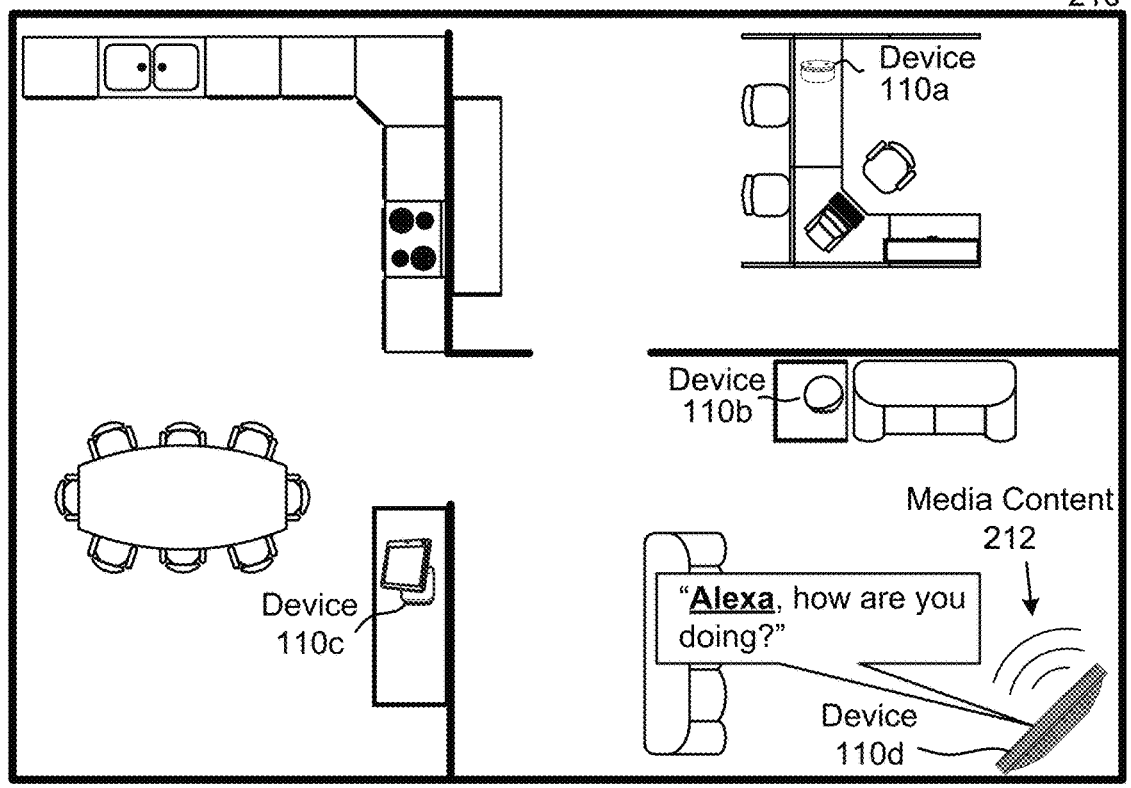
Media Content Example 210
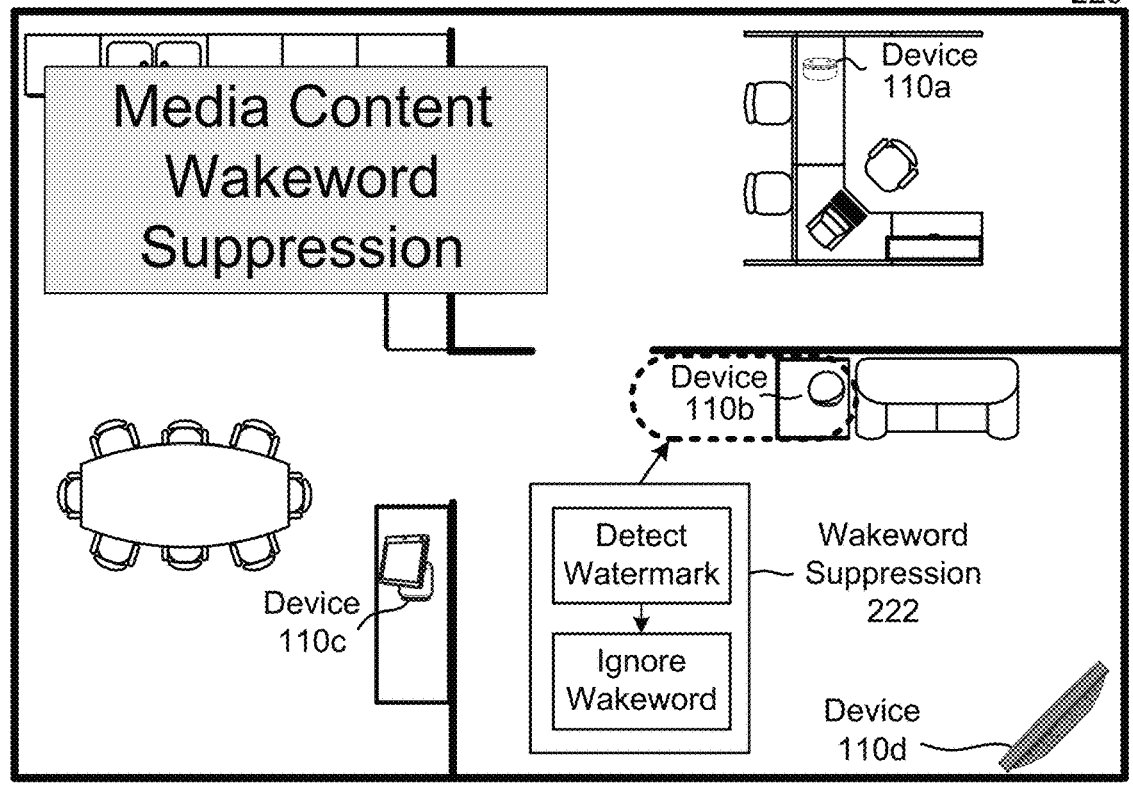
Media Content Example 220

FIG. 2B
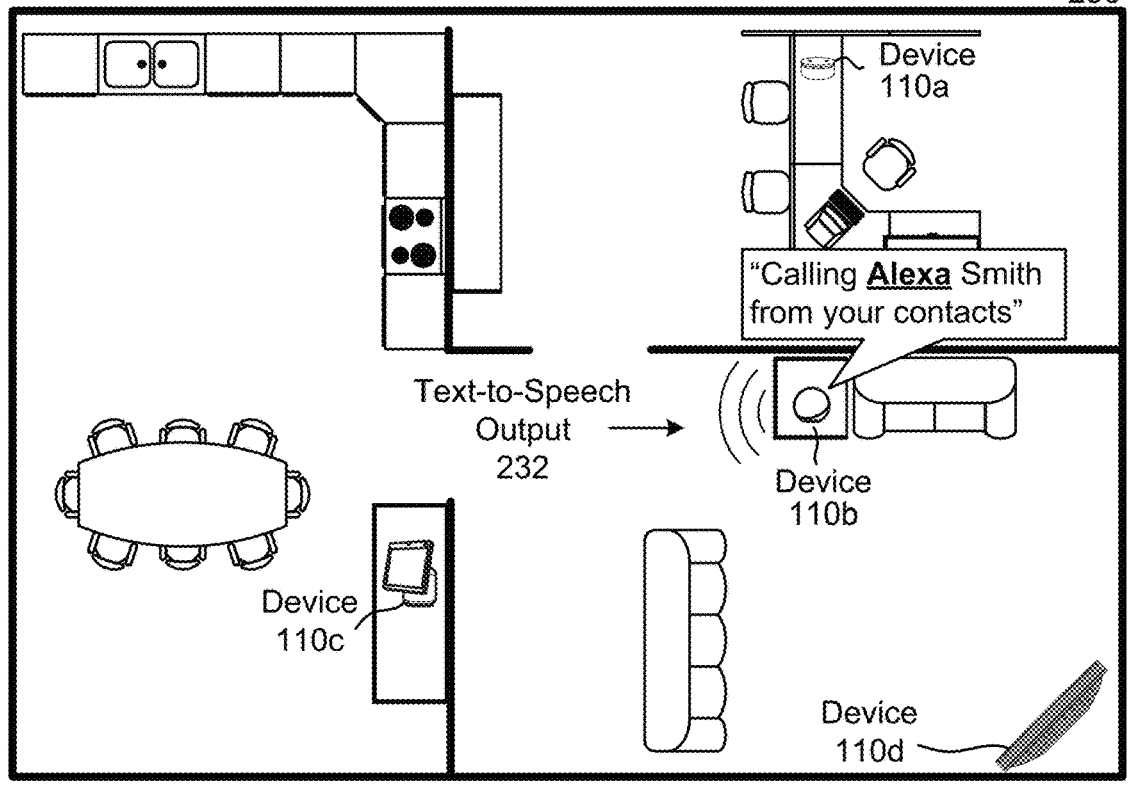
Cross-Talk Example 230
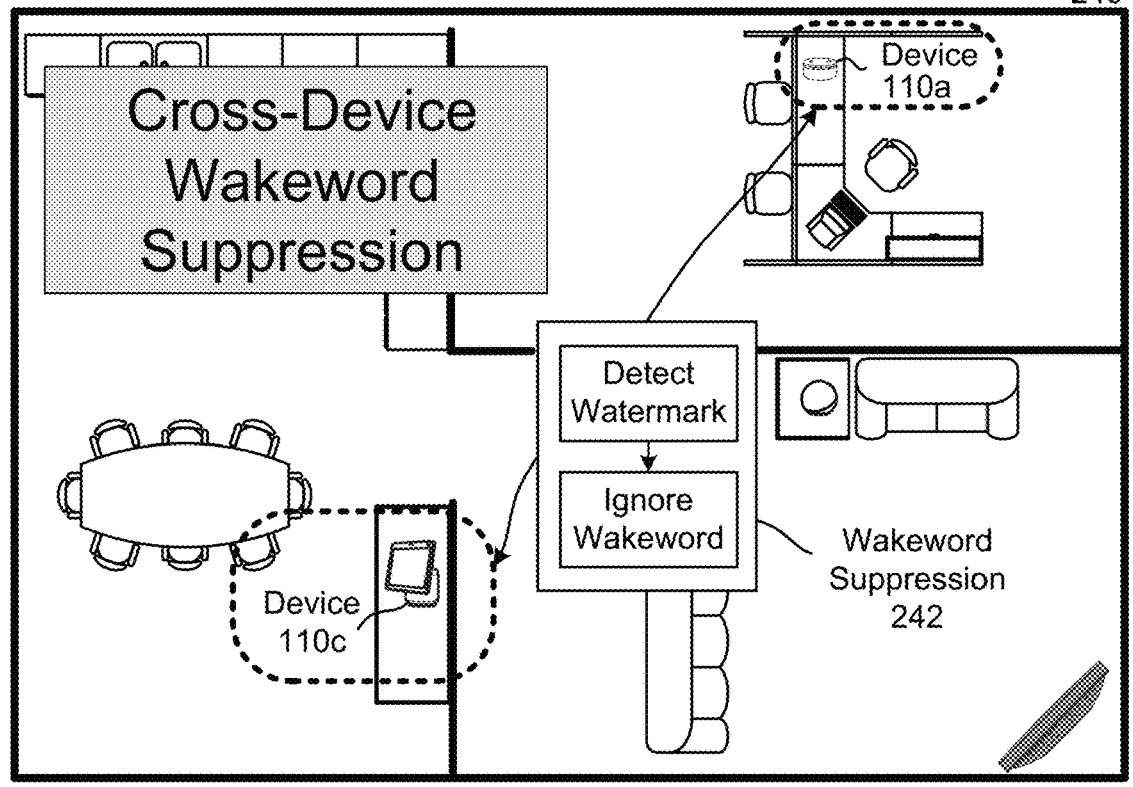
Cross-Talk Example 240

FIG. 2C
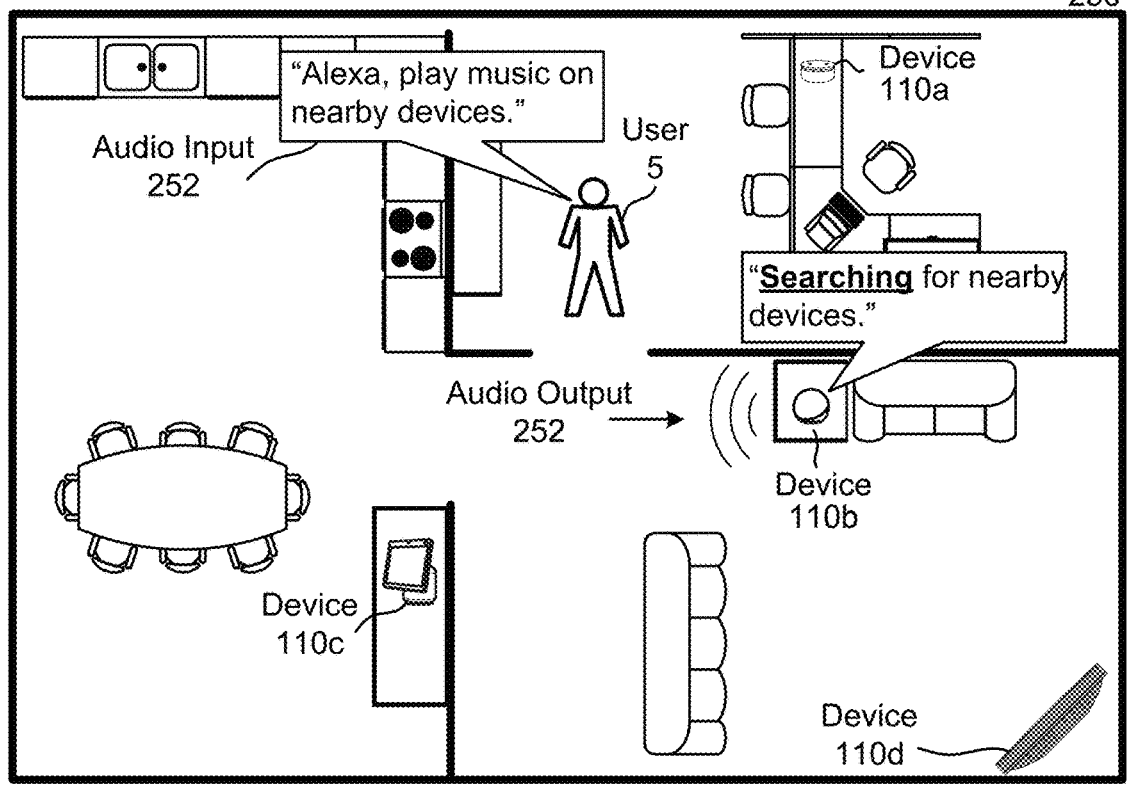
Transmission Example 250
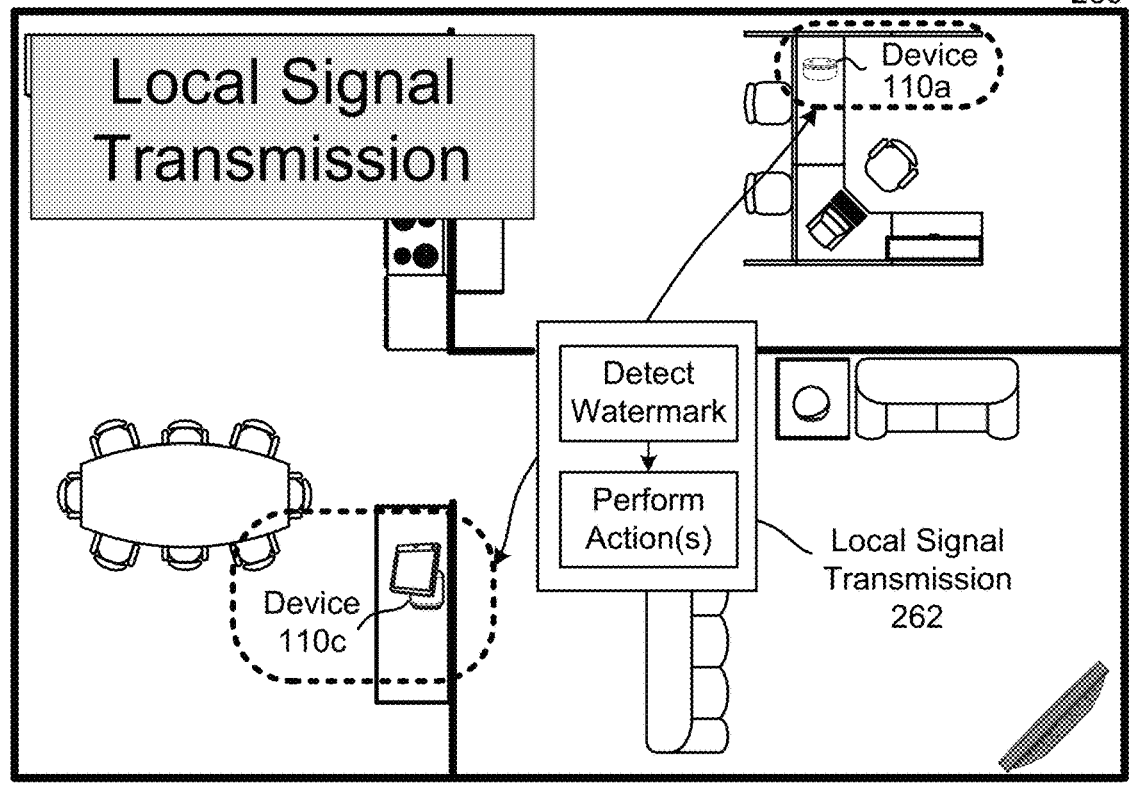
Transmission Example 260

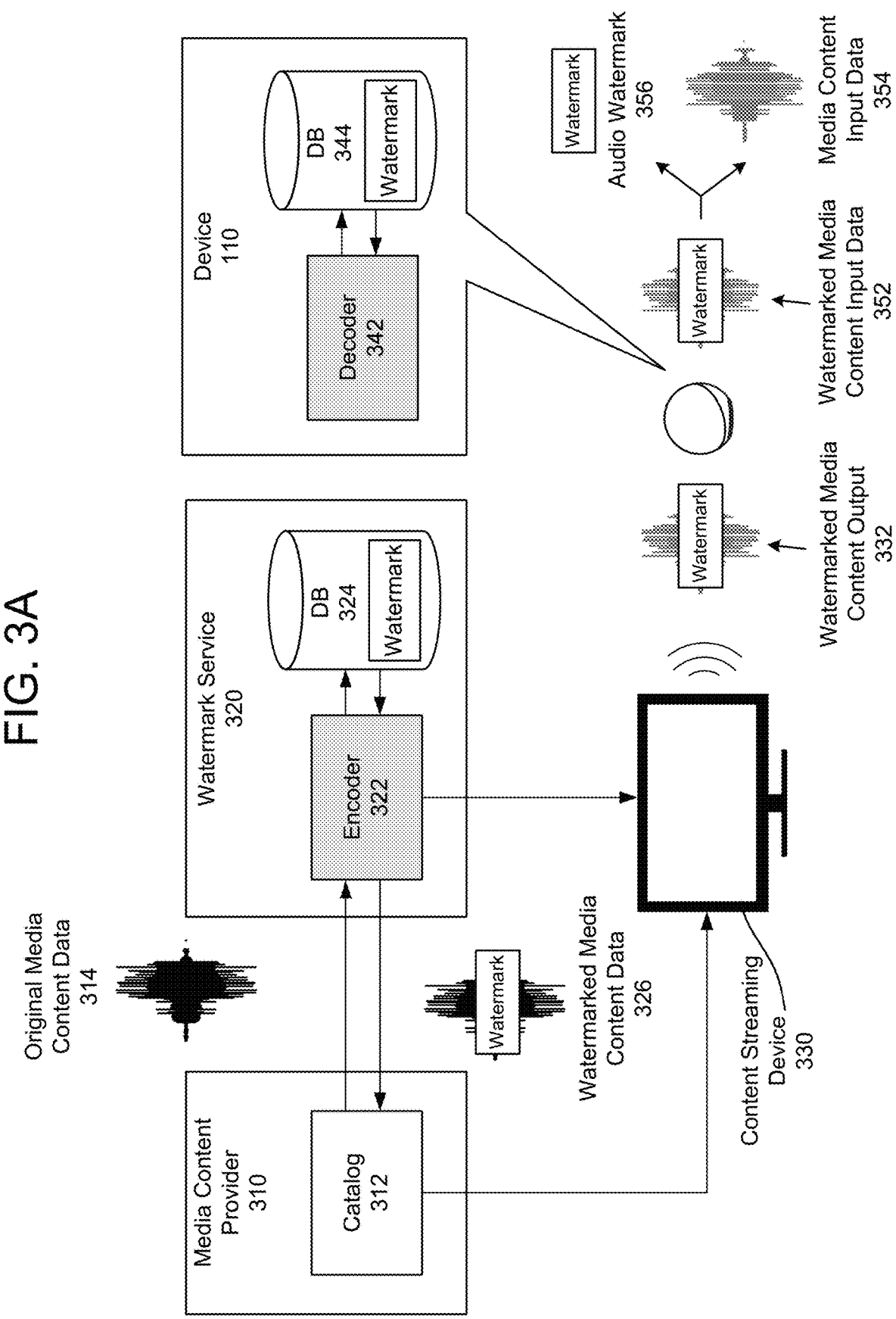

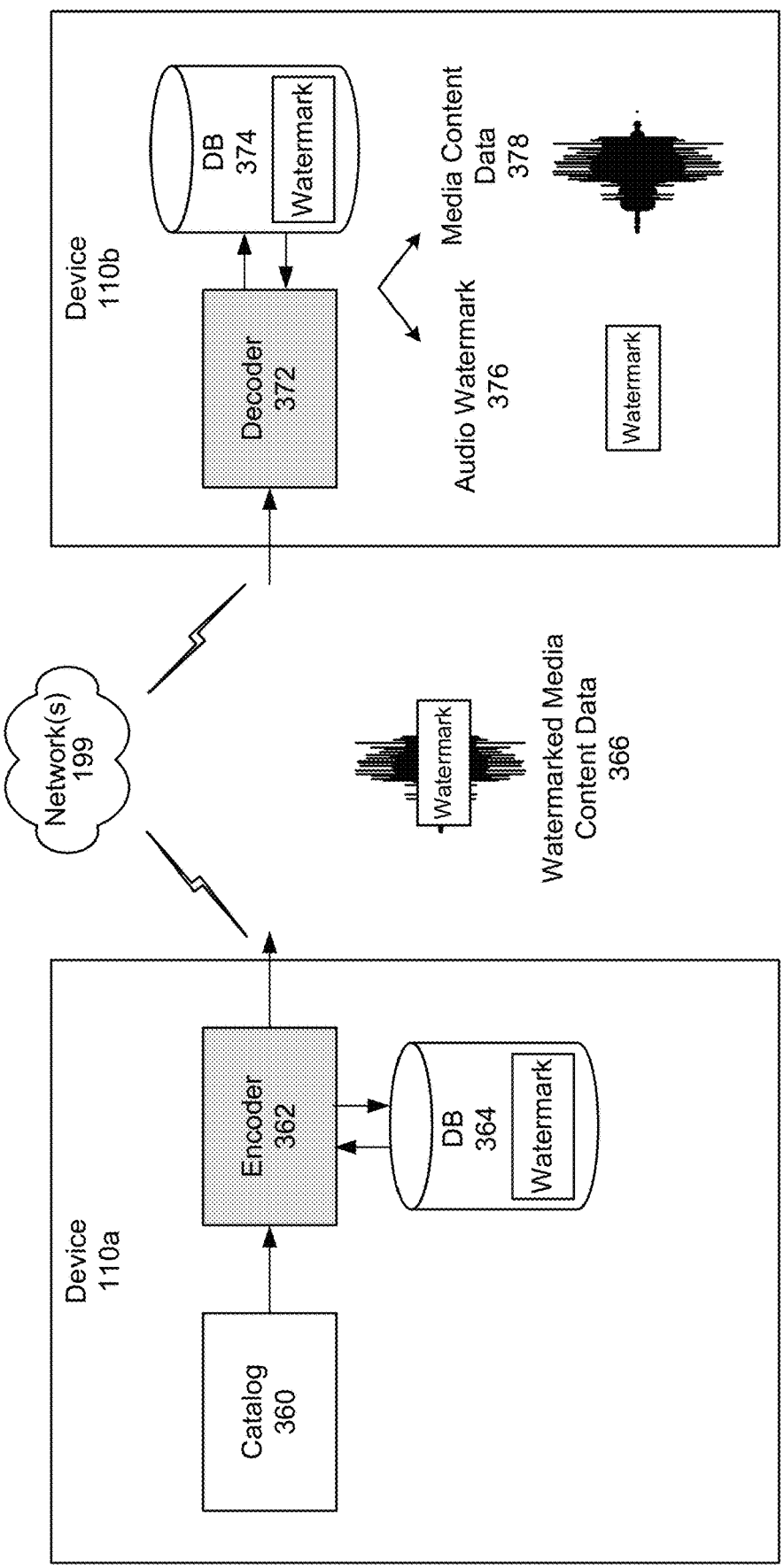

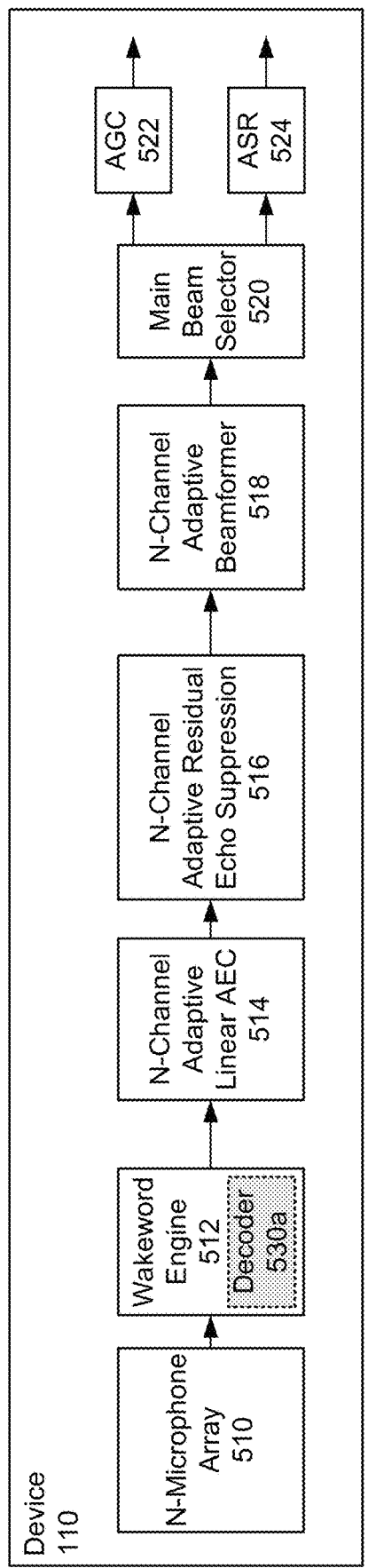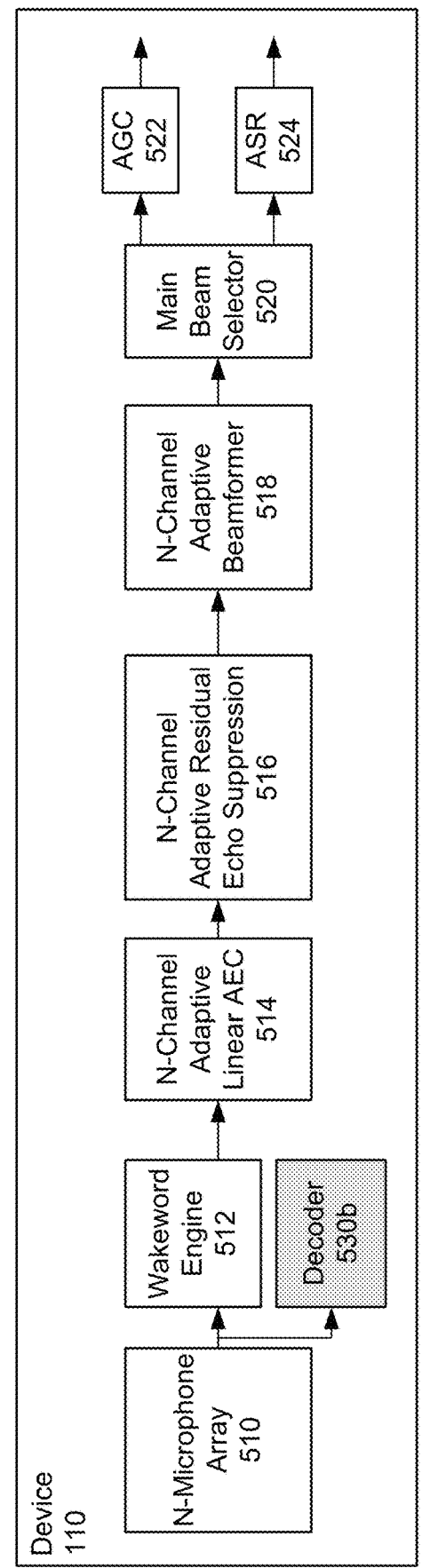

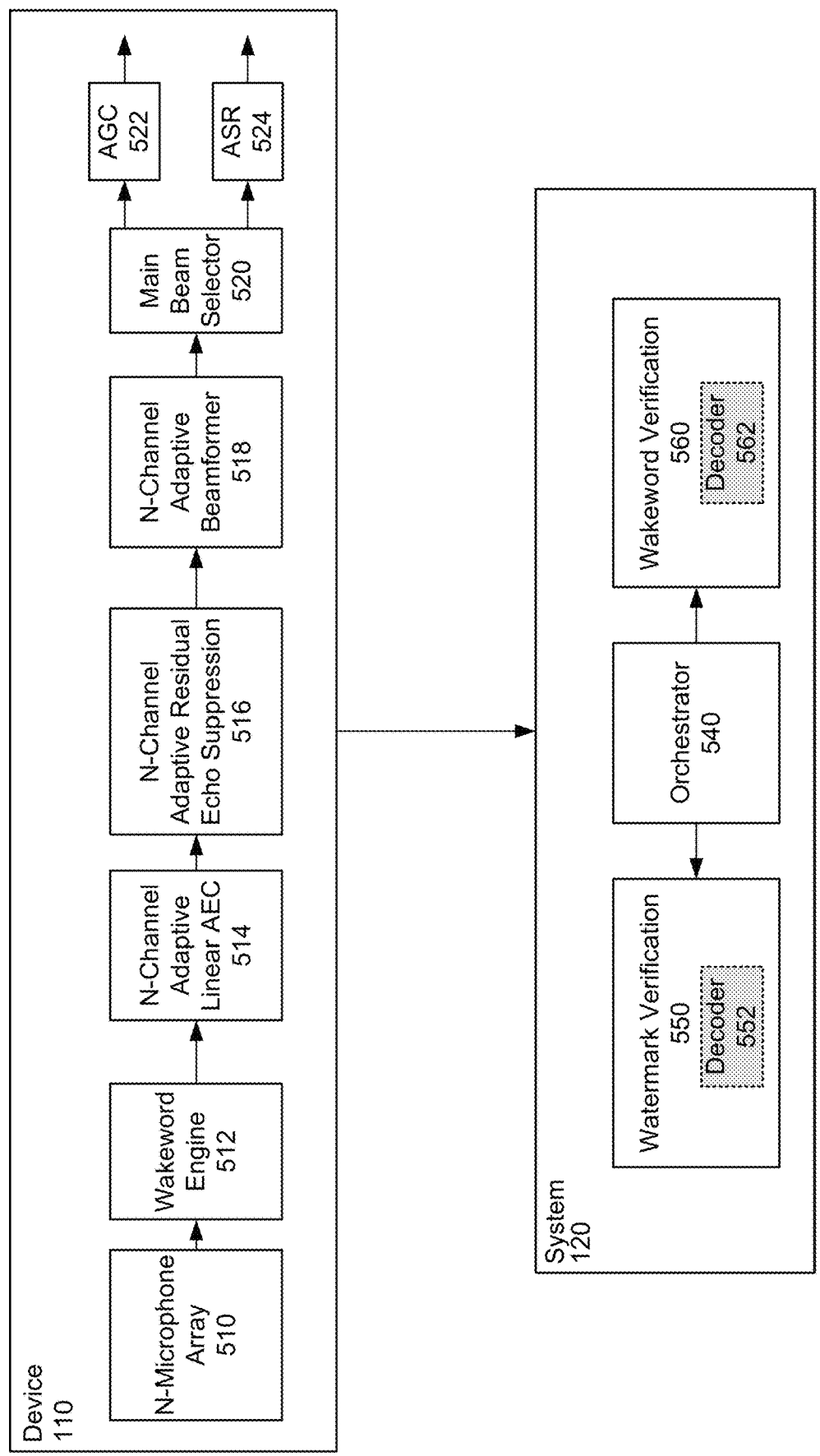

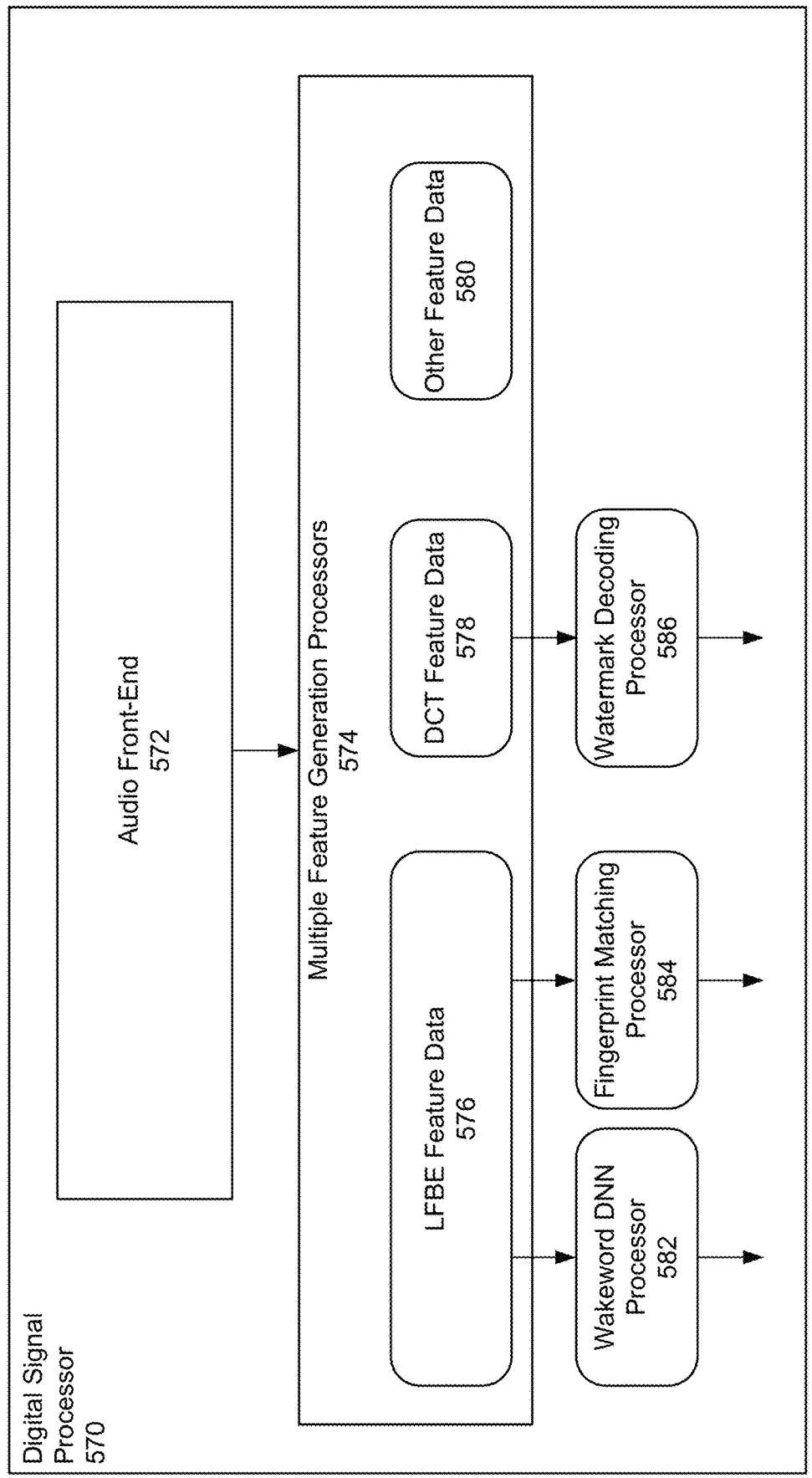

AUDIO WATERMARKING

CROSS-REFERENCE TO RELATED APPLICATION DATA

This application claims priority to U.S. Provisional Patent Application Ser. No. 63/241,270, entitled "Audio Watermarking," filed on Sep. 7, 2021, in the names of Ameya Agaskar, et al. The above provisional application is herein incorporated by reference in its entirety.

BACKGROUND

With the advancement of technology, the use and popularity of electronic devices has increased considerably. Electronic devices are commonly used to capture and process audio data.

Described herein are technological improvements to such systems, among other things.

BRIEF DESCRIPTION OF DRAWINGS

For a more complete understanding of the present disclosure, reference is now made to the following description taken in conjunction with the accompanying drawings.

FIG. 1 illustrates a system for encoding and decoding audio watermarks according to embodiments of the present disclosure.

FIGS. 2A-2D illustrate examples of unique functionality enabled by encoding and decoding audio watermarks according to embodiments of the present disclosure.

FIGS. 3A-3B illustrate examples of a component diagram for encoding media content according to embodiments of the present disclosure.

FIGS. 5A-5D illustrate examples of component diagrams for decoding audio watermarks according to embodiments of the present disclosure.

DETAILED DESCRIPTION

Figure 2D:
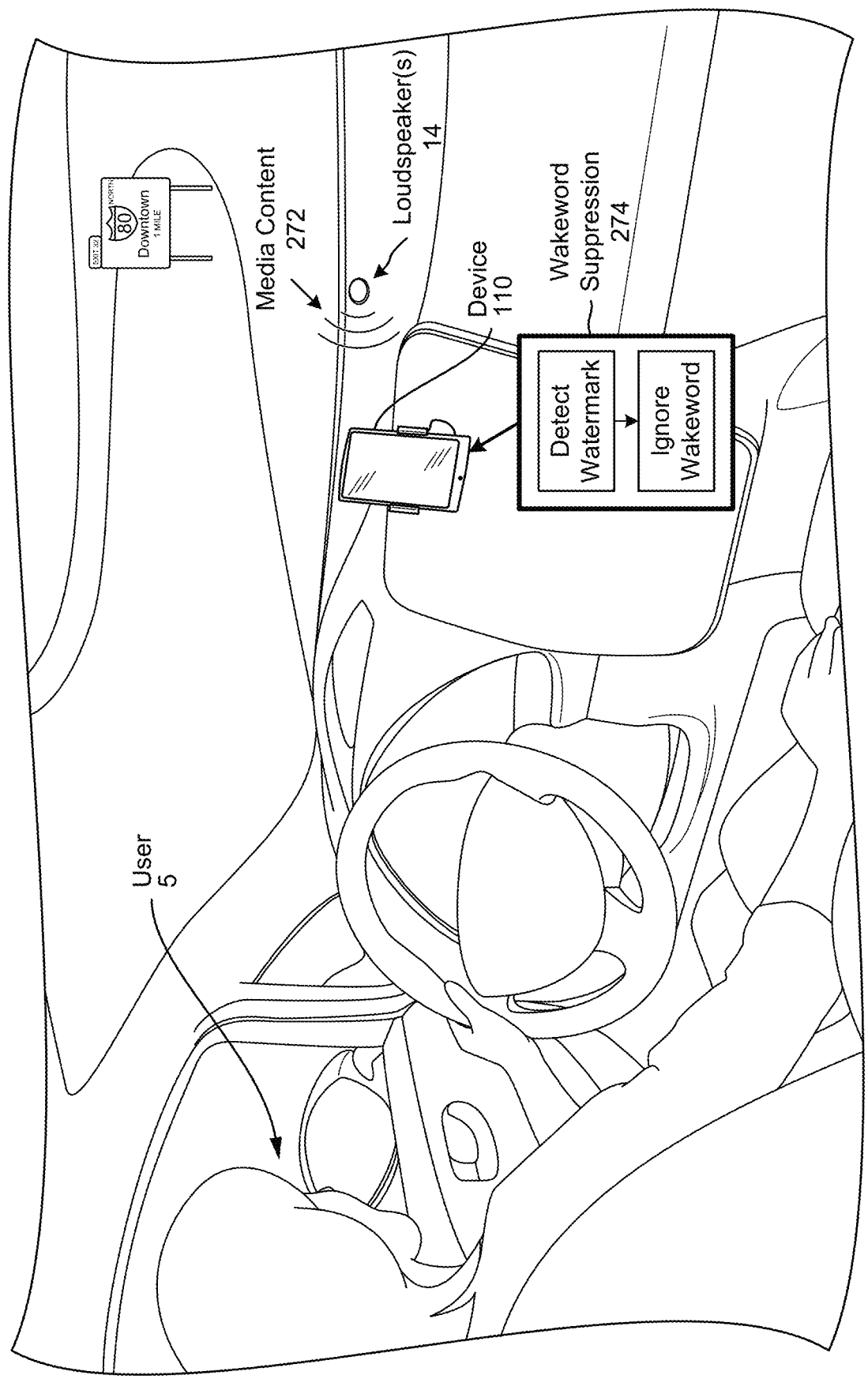

Electronic devices may be used to capture audio data and generate audio. For example, an electronic device may generate audio using loudspeakers and may capture audio data using one or more microphones. If multiple electronic devices are located in proximity to each other (e.g., capable of capturing the same audio), the electronic devices may capture audio generated by a neighboring device.

To enable unique functionality between neighboring devices, an encoding algorithm and a decoding algorithm may be used to embed audio watermark(s) within any media content, such as audio data. For example, the encoding algorithm and decoding algorithm enable the audio watermark(s) to be detected despite the presence of reverberation caused by sound wave transmission (e.g., when watermarked audio data is output by a loudspeaker and recaptured by a microphone). Thus, neighboring devices may embed audio watermarks to instruct other devices to perform an action, enabling local signal transmission and/or wakeword suppression (e.g., avoid cross-talk between devices). However, if an audio watermark is louder than the underlying audio data, the audio watermark may be audible to and/or perceived by a user.

To embed an audio watermark without the audio watermark being audible to a user, devices, systems and methods are disclosed that embed audio watermark(s) in output audio data using scaling factors that are calculated based on a spectral masking level for each frame. The scaling factors may vary over time and correspond to an amplitude of the audio watermark across a series of watermark frames. The system may process the audio data to determine a spectral mask, which acts as a threshold for the scaling factors. For example, the spectral mask may indicate an amount of energy perceived in a first frequency range that is caused by energy represented in neighboring frequency ranges. This indicates how much energy can be added to the first frequency range while remaining imperceptible to the user. Thus, by selecting scaling factor values that keep an amplitude of the audio watermark below the threshold indicated by the spectral mask, the system may embed the audio watermark in the first audio data without the audio watermark being audible to the user.

FIG. 1 illustrates a system for encoding and decoding audio watermarks according to embodiments of the present disclosure. As illustrated in FIG. 1, a system 100 may include one or more devices 110, such as a first speech controlled device 110a and a second speech controlled device 110b (e.g., voice-enabled devices 110). While FIG. 1 illustrates each of the devices 110 being a speech controlled device, the disclosure is not limited thereto and the system 100 may include any smart device capable of connecting to a wireless network. As illustrated in FIG. 1, the first speech controlled device 110a (hereinafter "first device 110a") and/or the second speech controlled device 110b (hereinafter "second device 110b") may include a microphone array 112 and/or one or more loudspeaker(s) 114. While FIG. 1 illustrates the first device 110a including a display and the second device 110b not including a display, the disclosure is not limited thereto and a display may be included or not included in individual devices 110 without departing from the disclosure.

To detect user speech or other audio, each device 110 may use one or more microphones in the microphone array 112 to generate microphone audio data that captures audio in a room (e.g., an environment) in which the device 110 is located. For example, if the devices 110 are located within earshot of a user 5, the devices 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. For example, the device 110 may include a wakeword engine that processing the microphone audio data to detect a representation of a wakeword. When a wakeword is detected in the microphone audio data, the device 110 may generate audio data corresponding to the wakeword and send the audio data to the system 120 for speech processing. The system 120 may process the audio data, determine the voice command, and perform one or more actions based on the voice command. For example, the system 120 may generate a command instructing the device 110 (or any other device) to perform an action, may generate output audio data corresponding to the action, may send the output audio data to the device 110, and/or may send the command to the device 110.

In some examples, the device 110 may generate microphone audio data that captures a wakeword that does not correspond to speech from the user 5. For example, the first device 110a may generate output audio including a representation of the wakeword and the second device 110b may capture the output audio and detect the representation of the wakeword. Upon detecting the representation of the wakeword, the second device 110b may generate audio data and send the audio data to the system 120 for speech processing. However, the audio data does not correspond to speech from the user 5 and therefore does not correspond to a voice command.

To prevent nearby devices from sending audio data to the system 120, in some examples the system 100 may embed output audio data with an audio watermark to perform wakeword suppression. For example, if a representation of the wakeword is included in output audio data being sent to the first device 110a, the system 100 may embed the audio watermark in the output audio data. Thus, the second device 110b may detect the representation of the wakeword but may also detect the audio watermark instructing the second device 110b to ignore the wakeword. Additionally or alternatively, the system 100 may embed audio watermark(s) in output audio data to perform unique functionality, such as local signal transmission, as will be described in greater detail below.

As illustrated in FIG. 1, the system 120 may receive (130) first audio data and may determine (132) to embed a first audio watermark within the first audio data. For example, the system 120 may detect that a wakeword is represented within a first time window of the first audio data and may determine to embed the first audio watermark within the first time window of the first audio data in order to enable wakeword suppression, although the disclosure is not limited thereto. Embedding the first audio watermark enables wakeword suppression as the device 110 may detect that the first audio watermark and ignore a wakeword represented in the first audio data. However, the disclosure is not limited thereto and the system 120 may embed audio watermarks corresponding to different commands and/or actions without departing from the disclosure.

In some examples, the system 120 may receive the first audio data from a storage component or third party server(s). For example, the first audio data may correspond to media content stored in the storage component or the third party server(s) and the system 120 may determine to embed the first audio watermark to enable wakeword suppression when the media content is output by the device 110. Thus, the system 120 may embed the first audio watermark and/or additional audio watermarks in the media content to generate watermarked media content. The storage component and/or the third party server(s) may store the watermarked media content in place of the original media content, enabling the storage component and/or the third party server(s) to send the watermarked media content to multiple devices 110 and/or to a single device 110 multiple times without departing from the disclosure.

The disclosure is not limited thereto, however, and in other examples the system 120 may generate the first audio data during a dialog with the user 5, such that the first audio data may be intended for the first device 110a. For example, the user 5 may generate speech corresponding to a voice command, the first device 110a may generate audio data including a representation of the speech and may send the audio data to the system 120 for speech processing. In response to receiving the voice command, the system 120 may generate the first audio data indicating to the user 5 one or more actions that are being performed and/or will be performed (e.g., by the system 120, the first device 110a, the second device 110b, and/or other devices not illustrated in FIG. 1). During normal speech processing, the system 120 may send the first audio data directly to the first device 110a and the first device 110a may use the first audio data to generate output audio via the loudspeaker(s) 114.

As part of embedding the first audio watermark, the system 120 may determine (134) scaling factor data corresponding to the first audio watermark. In some examples, the scaling factor data may include a series of scaling factor values corresponding to a series of watermark frames (e.g., segments of the first audio watermark). For example, the system 120 may set the watermark frame length to a first length of time (e.g., 10 ms) and may determine an individual scaling factor value for each segment of the first audio watermark corresponding to the first length of time. Thus, the system 120 may select an amplitude of the first audio watermark for each audio frame (e.g., 10 ms time interval within the first audio data), such that the scaling factor value and corresponding amplitude of the first audio watermark may vary over time.

As described in greater detail below with regard to FIG. 7, the system 120 may automatically determine the scaling factor data by balancing detectability (e.g., increasing a likelihood that the devices 110 detect the embedded audio watermarks) and perceptibility (e.g., decreasing a likelihood that the audio watermarks are audible to the user 5 and other viewers). In some examples, the system 120 may process the first audio data to determine a spectral mask, which acts as a threshold for the scaling factor data. For example, the spectral mask may indicate an amount of energy perceived in a first frequency range that is caused by energy represented in neighboring frequency ranges. This indicates how much energy can be added to the first frequency range while remaining imperceptible (e.g., inaudible to the user 5). Thus, by selecting scaling factor values that keep an amplitude of the audio watermark below the threshold indicated by the spectral mask, the system 120 may embed the audio watermark in the first audio data without the audio watermark being audible to the user 5.

The system 120 may generate (136) second audio data by embedding the first audio watermark within the first audio data, and may send (138) the second audio data to another component and/or device, such as the storage component, the third party server(s), the first device 110a, and/or the like. In the example illustrated in FIG. 1, the system 120 may determine to embed the first audio watermark in order to enable unique functionality. Thus, the first audio watermark may correspond to a command instructing one or more devices 110 to perform an action. For example, the system 120 may generate the second audio data with the first audio watermark embedded in order to send the command from the first device 110a to neighboring device(s) 110 (e.g., one or more devices 110 in proximity to the first device 110a, such as the second device 110b). Detecting the first audio watermark may enable unique functionality, as described in greater detail below with regard to FIGS. 2A-2D, such as performing wakeword suppression, local signal transmission, and/or the like.

In some examples, the system 120 may determine to embed the first audio watermark in order to perform wakeword suppression. For example, the system 120 may detect a representation of a wakeword during a first time window within the first audio data and may generate the second audio data by embedding the first audio watermark within the first time window. In this example, the first audio watermark may correspond to a command to perform wakeword suppression (e.g., ignore the representation of the wakeword in the first audio data). Thus, when neighboring device(s) 110 detect the representation of the wakeword, they may also detect the first audio watermark and may ignore the representation of the wakeword instead of sending audio data to the system 120.

Additionally or alternatively, the system 120 may generate the first audio data and embed the first audio watermark within the first audio data in order to perform local signal transmission between the first device 110a and any neighboring device(s) 110 (e.g., the second device 110b). To illustrate an example of performing local signal transmission, the voice command may correspond to a request that music be played by the first device 110a and any nearby devices 110. In response, the system 120 may generate the first audio data as a notification that an action is being performed and generate the second audio data by embedding the first audio watermark within the first audio data. For example, the first audio data may correspond to a sentence (e.g., "Searching for nearby devices") and the first audio watermark may be embedded within the sentence and/or specific words of the sentence (e.g., "Searching"). In this example, the first audio watermark may correspond to a command instructing nearby devices to synchronize in order to play music. Thus, any device 110 that detects the first audio watermark may send a message to the first device 110a and/or the system 120 in order to synchronize playback of streaming music.

The first device 110a may receive (140) the second audio data. In some examples, the first device 110a may receive the second audio data from the system 120, although the disclosure is not limited thereto and the first device 110a may receive the second audio data from the storage component, the third party server(s), and/or the like without departing from the disclosure.

After receiving the second audio data, the first device 110a may send (142) the second audio data to the loudspeaker(s) 114 to generate output audio. To illustrate a first example corresponding to wakeword suppression, the first device 110a may generate output audio corresponding to a sentence that includes a representation of the wakeword (e.g., "Calling Alexa Smith from your contacts"), with the first audio watermark embedded in the wakeword (e.g., "Alexa"). To illustrate a second example corresponding to local signal transmission, the first device 110a may generate output audio corresponding to a sentence indicating an action being performed (e.g., "Searching for nearby devices"), with the first audio watermark embedded in one or more words in the sentence (e.g., "searching").

The second device 110b may generate (150) third audio data corresponding to the output audio using one or more microphone(s) of the microphone array 112. The second device 110b may detect (152) the first audio watermark within the third audio data, may determine (154) the command associated with the first audio watermark, and may perform (156) an action corresponding to the command. To continue the first example, the second device 110b may detect the representation of the wakeword (e.g., "Alexa) within the third audio data, may detect the first audio watermark within the third audio data, may determine that the first audio watermark corresponds to a command to ignore the representation of the wakeword, and may perform a corresponding action (e.g., ignore the representation of the wakeword instead of sending the third audio data to the system 120). To continue the second example, the second device 110b may detect the first audio watermark within the third audio data, may determine that the first audio watermark corresponds to a command to synchronize playback of music with the first device 110a, and may perform a corresponding action (e.g., send a message to the first device 110a and/or the system 120 in order to synchronize playback of the music).

FIGS. 2A-2D illustrate examples of unique functionality enabled by encoding and decoding audio watermarks according to embodiments of the present disclosure. As illustrated in FIG. 2A, a first media content example 210 corresponds to embedding an audio watermark in media content 212 to perform wakeword suppression during playback of the media content 212. For example, the media content 212 may correspond to audio, video, and/or other media content that includes a sentence (e.g., "Alexa, how are you doing") that includes a representation of a wakeword.

During normal playback of the media content 212 (e.g., without the audio watermark embedded), a fourth device 110d (e.g., television) may generate output audio corresponding to the media content 212 and neighboring device(s) 110 (e.g., first device 110a, second device 110b, third device 110c, and/or the like) may detect a representation of the wakeword. In response to detecting the representation of the wakeword, the neighboring device(s) 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the media content 212 is embedded with the audio watermark, however, the neighboring device(s) 110 may detect the audio watermark and ignore the representation of the wakeword. As illustrated in FIGS. 2A-2C, an embedded audio watermark is indicated by bolded and underlined text. Thus, the first media content example 210 indicates that the audio watermark is embedded within a first word (e.g., "Alexa") of the media content 212. The disclosure is not limited thereto, however, and the audio watermark may be embedded within a different word and/or two or more words of the media content 212 without departing from the disclosure.

In the example illustrated in FIG. 2A, the only device 110 close enough to the fourth device 110d to detect the representation of the wakeword is the second device 110b.

However, as a result of the audio watermark being embedded in the media content 212, FIG. 2A illustrates a second media content example 220 showing that the second device 110b may perform wakeword suppression 222 by detecting the audio watermark and ignoring the wakeword. Thus, despite detecting the representation of the wakeword, the neighboring device(s) 110 (e.g., first device 110a, second device 110b, third device 110c, and/or the like) may not generate audio data and/or send the audio data to the system 120.

As illustrated in FIG. 2B, a first cross-talk example 230 corresponds to embedding an audio watermark in text-to-speech (TTS) output 232 to perform wakeword suppression during playback of the TTS output 232. For example, the TTS output 232 may correspond to audio that includes synthesized speech corresponding to a sentence (e.g., "Calling Alexa Smith from your contacts") that includes a representation of a wakeword.

During normal playback of the TTS output 232 (e.g., without the audio watermark embedded), the second device 110b may generate output audio corresponding to the TTS output 232 and neighboring device(s) 110 (e.g., first device 110a, third device 110c, and/or the like) may detect a representation of the wakeword. In response to detecting the representation of the wakeword, the neighboring device(s) 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the TTS output 232 is embedded with the audio watermark, however, the neighboring device(s) 110 may detect the audio watermark and ignore the representation of the wakeword. As mentioned above, an embedded audio watermark is indicated by bolded and underlined text. Thus, the first cross-talk example 230 indicates that the audio watermark is embedded within a first word (e.g., "Alexa") of the TTS output 232. The disclosure is not limited thereto, however, and the audio watermark may be embedded within a different word and/or two or more words of the TTS output 232 without departing from the disclosure. As a result of the audio watermark being embedded in the TTS output 232, FIG. 2B illustrates a second cross-talk example 240 showing that the first device 110a and the third device 110c may perform wakeword suppression 242 by detecting the audio watermark and ignoring the wakeword. Thus, despite detecting the representation of the wakeword, the neighboring device(s) 110 (e.g., first device 110a, third device 110c, and/or the like) may not generate audio data and/or send the audio data to the system 120.

While FIGS. 2A-2B illustrate examples of performing wakeword suppression, the disclosure is not limited thereto. Instead, the system 120 may embed audio watermarks in order to implement other unique functionality that is not limited to performing wakeword suppression. FIG. 2C illustrates an example of performing local signal transmission in order to send commands to neighboring device(s) 110 by generating audio. For example, the second device 110b may generate output audio that includes an embedded audio watermark. While the audio watermark corresponds to a command, it may be embedded within the output audio such that it is undetectable by the user 5. Thus, neighboring device(s) 110 may capture the output audio using the microphone array 112, detect the audio watermark embedded in the output audio, determine the command associated with the audio watermark, and perform one or more action(s) corresponding to the command.

As illustrated in FIG. 2C, a first transmission example 250 corresponds to embedding an audio watermark in audio output 252 to perform local signal transmission and send a command to one or more neighboring device(s) 110. For example, the audio output 252 may correspond to audio that includes synthesized speech representing a sentence (e.g., "Searching for nearby devices"). In contrast to the examples illustrated in FIGS. 2A-2B, the audio output 252 does not include a representation of the wakeword. While the audio output 252 is described as corresponding to synthesized speech (e.g., generated using text-to-speech processing), the disclosure is not limited thereto and the audio output 252 may correspond to any other audio data without departing from the disclosure.

During normal playback of the audio output 252 (e.g., without the audio watermark embedded), the second device 110b may generate the audio output 252 using the loudspeaker(s) 114. As a representation of the wakeword is not included in the audio output 252, the neighboring device(s) 110 (e.g., first device 110a, third device 110c, and/or the like) will not detect a representation of the wakeword and therefore may ignore the audio output 252 and not capture audio data or perform any action(s).

When the audio output 252 is embedded with the audio watermark, however, the neighboring device(s) 110 may detect the audio watermark and perform one or more actions associated with the audio watermark. As mentioned above, an embedded audio watermark is indicated by bolded and underlined text. Thus, the first transmission example 250 indicates that the audio watermark is embedded within a first word (e.g., "Searching") of the audio output 252. The disclosure is not limited thereto, however, and the audio watermark may be embedded within a different word and/or two or more words of the audio output 252 without departing from the disclosure. As a result of the audio watermark being embedded in the audio output 252, FIG. 2C illustrates a second transmission example 260 showing that the first device 110a and the third device 110c may perform local signal transmission 262 by detecting the audio watermark and performing action(s). Thus, despite not detecting the representation of the wakeword, the neighboring device(s) 110 (e.g., first device 110a, third device 110c, and/or the like) may perform one or more action(s) associated with the audio watermark embedded within the audio output 252.

As discussed above, the one or more action(s) may correspond to sending a message to the second device 110b and/or the system 120, although the disclosure is not limited thereto. Instead, the one or more action(s) may correspond to any command known to one of skill in the art. As will be discussed in greater detail below, the devices 110 and/or the system 120 may use a watermark database to detect one of a plurality of audio watermarks. For example, each audio watermark included in the watermark database may correspond to a specific command and/or group of commands.

Additionally or alternatively, an audio watermark may correspond to a specific device, a group of devices, and/or be generic to all devices. For example, the second device 110b may embed a first audio watermark to send a first command to the first device 110a at a first time, may embed a second audio watermark to send a second command to the third device 110c at a second time, and/or may embed a third audio watermark to send a third command to both the first device 110a and the third device 110c at a third time.

As illustrated in FIG. 2D, a media content example 270 corresponds to embedding an audio watermark in media content 272 to perform wakeword suppression during playback of the media content 272 in a vehicle. For example, the media content 272 may correspond to audio, video, and/or other media content that includes a sentence including a representation of a wakeword.

During normal playback of the media content 272 (e.g., without the audio watermark embedded), loudspeaker(s) 14 included in the vehicle may generate output audio corresponding to the media content 272 and a device 110 (e.g., smart phone) may detect a representation of the wakeword. In response to detecting the representation of the wakeword, the device 110 may generate audio data and send the audio data to the system 120. In this example, the wakeword was not generated by the user 5 and therefore does not correspond to a voice command. Thus, sending the audio data to the system 120 is unnecessary and results in unnecessary processing by the system 120.

When the media content 272 is embedded with the audio watermark, however, the device 110 may detect the audio watermark and ignore the representation of the wakeword. In the example illustrated in FIG. 2D, the device 110 detects the representation of the wakeword and performs wakeword suppression 274 by detecting the audio watermark and ignoring the wakeword. Thus, despite detecting the representation of the wakeword, the device 110 may not generate audio data and/or send the audio data to the system 120.

While FIGS. 2A-2D illustrate audio data only being embedded with a single audio watermark, the disclosure is not limited thereto and audio data may be embedded with multiple audio watermarks without departing from the disclosure. For example, the audio output 252 may embed multiple audio watermarks within the sentence and/or within a single word of the sentence without departing from the disclosure.

FIGS. 3A-3B illustrate examples of a component diagram for encoding media content according to embodiments of the present disclosure. Referring back to FIG. 2A, embedding an audio watermark in media content may enable wakeword suppression during playback of the media content. As an example of media content, FIG. 3A illustrates a media content provider 310 including a catalog 312 of media content, such as original media content data 314. For example, the media content provider 310 may be a streaming service that streams the original media content data 314 to the device(s) 110 (e.g., a subscription streaming service). However, the disclosure is not limited thereto and the media content provider 310 may correspond to any source of media content, including network storage or other local devices that are accessible only to the user 5. In addition, the media content may correspond to any media content known to one of skill in the art, including audio data (e.g., music, radio stations, etc.), video data (e.g., television shows, movies, home videos, etc.), and/or the like.

In some examples, the system 100 may monitor the original media content data 314 while streaming the original media content data 314 to a content streaming device 330 in order to detect representation(s) of a wakeword and embed an audio watermark within each representation of the wakeword. For example, the media content provider 310 may send the original media content data 314 to the content streaming device 330 via a watermark service 320. The watermark service 320 may include an encoder component 322 and a watermark database 324 and the watermark service 320 may embed audio watermarks in the original media content data 314 to generate watermarked media content data 326. In this implementation, the watermark service 320 may store the watermarked media content data 326 and/or may directly stream the watermarked media content data 326 to the content streaming device 330. However, this implementation may consume a lot of resources and is inefficient as the system 100 must generate the watermarked media content data 326 each time the original media content data 314 is viewed by the user 5.

To improve efficiency, the media content provider 310 may instead send the original media content data 314 to the watermark service 320 a single time and may receive the watermarked media content data 326 from the watermark service 320. For example, media content provider 310 may send the original media content data 314 from the catalog 312 to the watermark service 320, the watermark service 320 may generate watermarked media content data 326 corresponding to the original media content data 314, and may send the watermarked media content data 326 back to the media content provider 310. Thus, the media content provider 310 may update the catalog 312 with the watermarked media content data 326 and may stream the watermarked media content data 326 directly to the content streaming device 330 in the future. Thus, this implementation embeds the audio watermarks a single time and reuses the watermarked media content data 326.

As illustrated in FIG. 3A, the content streaming device 330 may use the watermarked media content data 326 to generate watermarked media content output 332 via one or more loudspeaker(s). However, due to a distance between the one or more loudspeaker(s) of the content streaming device 330 and the device 110, the watermarked media content output 332 received by the device 110 includes distortion caused by reverberations (e.g., reflection/refraction of a sound wave inside a building structure). Thus, the watermarked media content output 332 captured by the device 110 is not identical to the watermarked media content 326, which is illustrated in FIG. 3A as the waveform changing shape and color (e.g., from black to gray). While there are multiple conventional techniques for detecting audio watermarks within digital audio data, the distortion caused by reverberation results in many of these techniques being unable to accurately detect the audio watermark after watermarked audio data is output by loudspeaker(s) and recaptured by microphone(s).

In contrast, the system 100 may be configured to detect the audio watermark despite the effects of reverberation. For example, the device 110 may include a decoder component 342 and a watermark database 344. The device 110 may capture the watermarked media content output 332 using the microphone array 112 and generate watermarked media content input data 352. Using the decoder component 342 and/or the watermark database 344, the device 110 may detect an audio watermark 356 embedded within the watermarked media content input data 352 and the device 110 may generate media content input data 354 and the audio watermark 356.

The decoding algorithm used by the system 100 may be able to detect the audio watermark 356 despite the effects of reverberation by performing a self-correlation. For example, while a cross-correlation between an ideal representation of the audio watermark 356 (e.g., without distortion) and the watermarked media content input data 352 may be unable to accurately detect the audio watermark 356, the system 100 may perform a cross-correlation between a first portion of the watermarked media content input data 352 and a second portion of the watermarked media content input data 352. As the encoder component 322 repeats the audio watermark 356 across two or more portions of the watermarked media content data 326, the effects of reverberation are applied equally to both a first representation of the audio watermark 356 included in the first portion and a second representation of the audio watermark 356 included in the second portion.

A variety of encoding/decoding algorithms may be used. For example, the system may use encoding and decoding techniques disclosed in U.S. Pat. No. 10,950,249, issued on Mar. 16, 2021 and entitled "AUDIO WATERMARK ENCODING/DECODING," which is hereby incorporated by reference in its entirety.

While FIG. 3A illustrates an example of generating output audio using loudspeaker(s) and detecting the audio watermark 356 despite the effects of reverberation, the disclosure is not limited thereto. Instead, the audio watermark may be embedded in audio data for copyright protection, without regard to whether the watermarked audio data will be output by loudspeaker(s). For example, the audio watermark may be embedded in media content data and transmitted digitally to a remote device, and the remote device may detect the audio watermark prior to generating any output audio. An example implementation is illustrated in FIG. 3B.

As illustrated in FIG. 3B, a first device 110*a* may include a catalog 360 of media content data, an encoder component 362, and a watermark database 364. The first device 110*a* may use the encoder component 362 to embed an audio watermark in media content data to generate watermarked media content data 366 and may send the watermarked media content data 366 to a second device 110*b* via network(s) 199 (e.g., using wired network(s), wireless network(s), and/or a combination thereof).

The second device 110*b* may receive the watermarked media content data 366 as a digital copy. The watermarked media content data 366 may have been subjected to multiple transmission channels, including encoding/decoding and/or compression, but the watermarked media content data 366 received by the second device 110*b* is substantially similar to when it was originally transmitted by the first device 110*a*. The second device 110*b* may include a decoder component 372 and a watermark database 374 and may separate the audio watermark 376 from the media content data 378. As a result of detecting the audio watermark 376, the second device 110*b* may perform an action corresponding to the audio watermark 376. For example, the second device 110*b* may apply copyright protection, preventing output of the media content data 378, copying of the media content data 378, and/or the like, although the disclosure is not limited thereto.

Figure 4A:
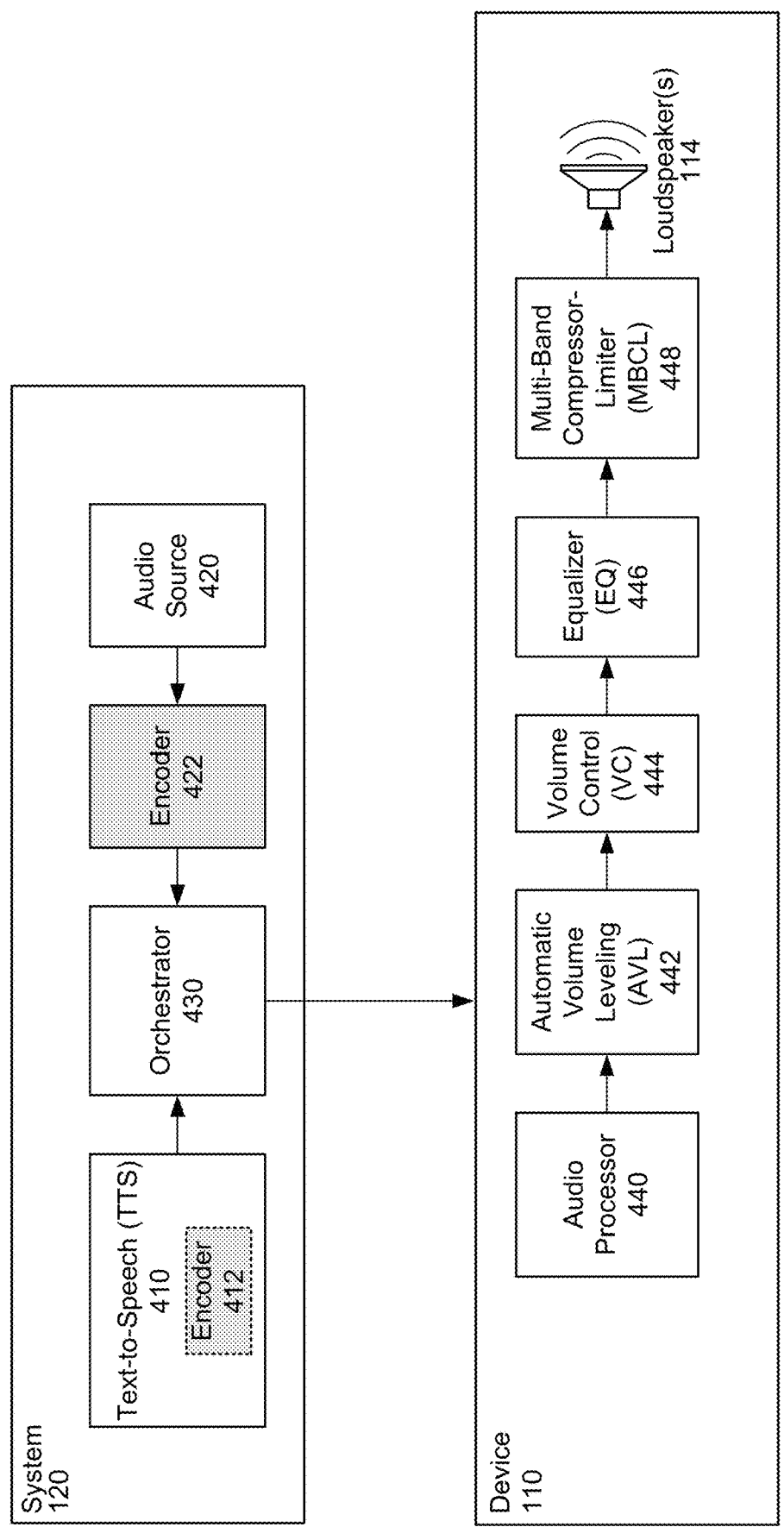
FIGS. 4A-4C illustrate examples of component diagrams for encoding audio watermarks according to embodiments of the present disclosure.
Figure 4B:
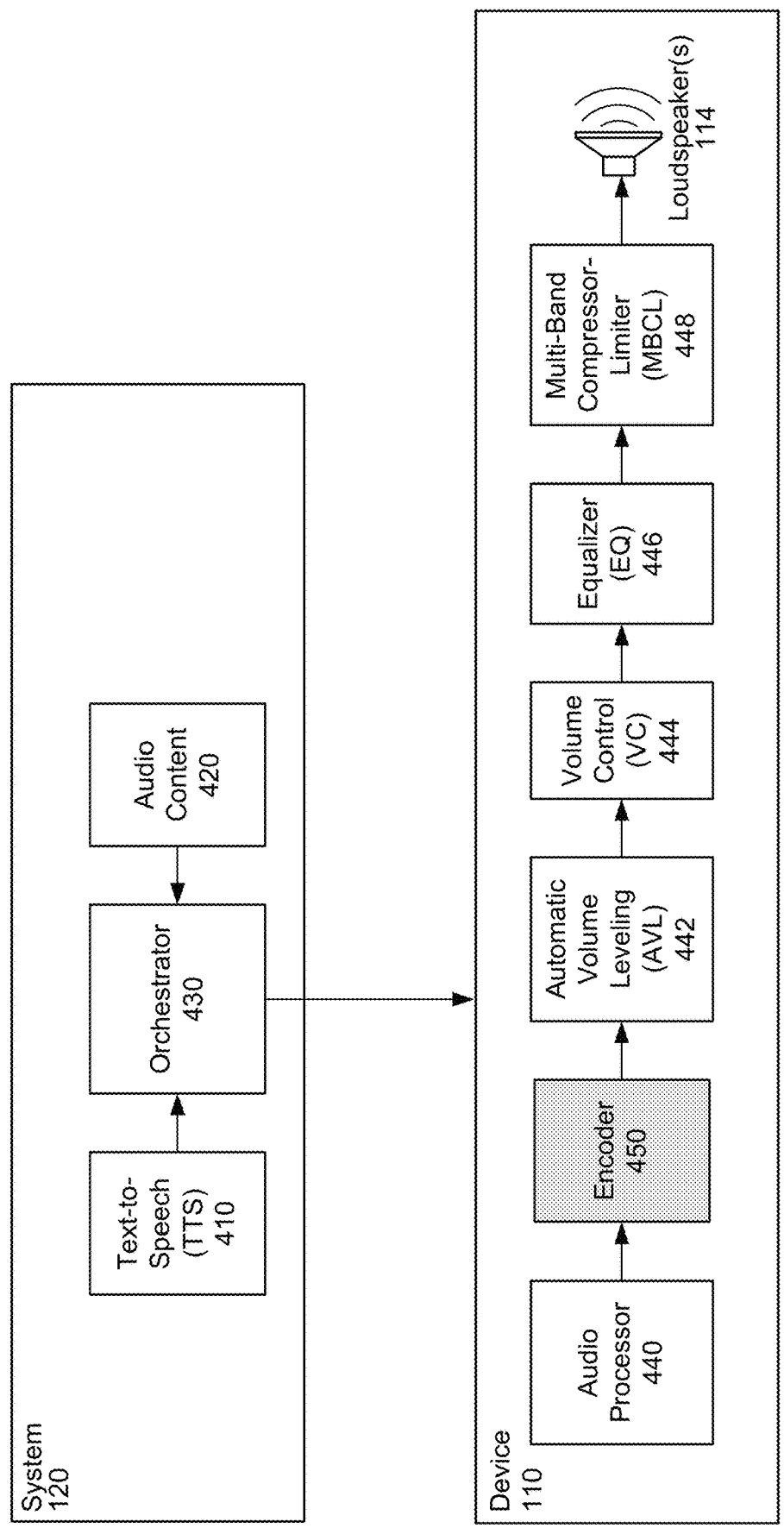
Figure 4C:
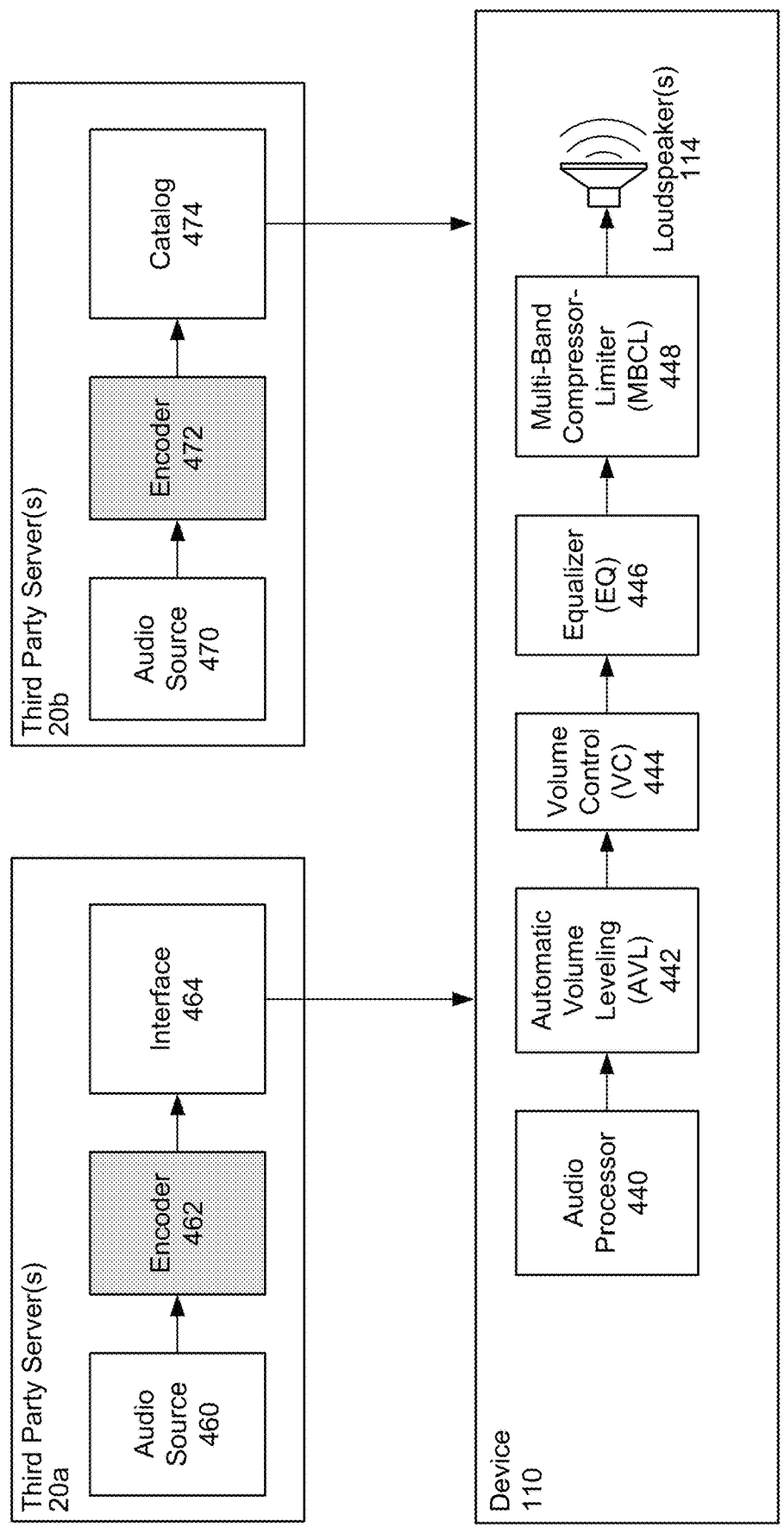

FIGS. 4A-4C illustrate examples of component diagrams for encoding audio watermarks according to embodiments of the present disclosure. As illustrated in FIG. 4A, the system 120 may encode audio watermarks using one or more encoders located along one or more audio paths.

As a first example, FIG. 4A illustrates a first encoder component (e.g., encoder component 412) along a first audio path (e.g., text-to-speech audio path). For example, the encoder component 412 may be included as part of a text-to-speech (TTS) 410 component operating on the system 120. Thus, the TTS 410 component may generate first audio data corresponding to synthesized speech and the encoder component 412 may generate second audio data by embedding the audio watermarks. Therefore, TTS output data generated by the TTS 410 component may include one or more embedded audio watermarks. While FIG. 4A illustrates the encoder component 412 as part of the TTS 410 component, the disclosure is not limited thereto and the encoder component 412 may be separate from the TTS 410 component without departing from the disclosure.

As a second example, FIG. 4A illustrates a second encoder component (e.g., encoder component 422) along a second audio path (e.g., audio content path). For example, the encoder component 422 may be an independent component that receives first audio data from an audio source 420 and may generate second audio data by embedding the audio watermark(s) in the first audio data. In contrast to the TTS audio path, which generates synthesized speech, the audio content path corresponds to non-TTS audio data, such as audio data corresponding to speech (e.g., pre-recorded first speech stored in a database, second speech generated by a remote user during a conversation, etc.), media content (e.g., pre-recorded audio sounds, pre-generated audio clips or audio recordings, audio associated with a video, etc.), and/or the like. Therefore, audio content data originating from the audio source 420, which can be a remote device, remote storage, a database of audio data, and/or the like, may be modified by embedding audio watermarks.

While FIG. 4A illustrates the system 120 including the first encoder component 412 and the second encoder component 422, the disclosure is not limited thereto. Instead, the system 120 may include the first encoder component 412, the second encoder component 422, and/or both the first encoder component 412 and the second encoder component 422 without departing from the disclosure.

Whether generated by the TTS 410 component or originating from the audio source 420, the first watermarked output audio data is sent to the orchestrator 430 of the system 120 and the orchestrator 430 sends the first watermarked output audio data to the device 110 to be output via the loudspeaker(s). To illustrate an example audio path associated with outputting the first watermarked output audio data, the device 110 may modify the first watermarked output audio data using an audio processor 440, an automatic volume leveling (AVL) 442 component (which may correspond to an automatic volume leveling and control (AVCL) component), a volume control (VC) 444 component, an equalizer (EQ) 446 component, and/or a multi-band compressor-limiter (MBCL) 448 component to generate the second watermarked output audio data to be sent to the loudspeaker(s) 114.

Instead of or in addition to encoding the audio watermark on the system 120, in some examples the device 110 may include an encoder component 450 and may encode the audio watermark(s) directly. As illustrated in FIG. 4B, the system 120 may not include an encoder component and may send first audio data without audio watermarks to the device 110. The device 110 may process the first audio data and generate watermarked second audio data using the encoder component 450. While FIG. 4B illustrates the encoder component 450 in a specific location along the audio pipeline, the disclosure is not limited thereto and a location of the encoder component 450 may vary without departing from the disclosure.

FIG. 4A only illustrates the system 120 being configured to perform watermark encoding, whereas FIG. 4B only illustrates the device 110 being configured to perform watermark encoding. However, the disclosure is not limited thereto, and in some examples both the system 120 and the device 110 may be configured to perform watermark encoding. For example, while the system 120 may perform a majority of the audio watermark encoding, the device 110 may be configured to embed audio watermarks in certain situations.

While FIGS. 4A-4B illustrate the system 120 and/or the device 110 performing watermark encoding, the disclosure is not limited thereto. As illustrated in FIG. 3A, a separate device (e.g., watermark service 320) may perform the watermark encoding without departing from the disclosure. However, while FIG. 3A illustrated the watermarked media content being output via loudspeaker(s) prior to being decoded, the disclosure is not limited thereto. Instead, FIG. 4C illustrates examples of a third party device or third party server(s) performing watermark encoding to generated watermarked audio data and the watermarked audio data being decoded prior to being output via loudspeaker(s). For example, the watermarked audio data may be generated and transmitted digitally to the device 110, and the device 110 may detect the audio watermark prior to generating any output audio via the loudspeaker(s) 114.

As a first example, FIG. 4C illustrates a first encoder component (e.g., encoder component 462) included within third party server(s) 20a along a first audio path. As illustrated in FIG. 4C, the first encoder component 462 may perform watermark encoding during transmission of first audio data. For example, the first audio data may originate at an audio source 460 and may be sent to encoder component 462, which generates second audio data by embedding an audio watermark within the first audio data. The second audio data is then sent to interface 464, which sends the second audio data to the device 110.

As a second example, FIG. 4C illustrates a second encoder component (e.g., encoder component 472) included within third party server(s) 20b along a second audio path, similar to the example illustrated in FIG. 3A. As illustrated in FIG. 4C, the second encoder component 472 may perform watermark encoding prior to transmission. For example, third audio data may originate at an audio source 470 and may be sent to encoder component 472, which generates fourth audio data by embedding an audio watermark within the third audio data. The fourth audio data is then sent to catalog 474, which stores the fourth audio data. At a later point in time, the device 110 may send a request to the third party server(s) 20b to receive the fourth audio data, and the catalog 474 may send the fourth audio data (e.g., watermarked audio data) to the device 110.

While FIGS. 4A-4C illustrate the device 110, the system 120, and/or the third party server(s) 20 including a number of components, this is intended as an illustrative example and the disclosure is not limited thereto. Instead, the device 110, the system 120, and/or the third party server(s) 20 may include additional components not illustrated in FIGS. 4A-4C and/or may omit components illustrated in FIGS. 4A-4C.

While not illustrated in FIGS. 4A-4C, the encoders 412/422/450/462/472 may include a volume control component configured to dynamically determine a scaling factor with which to embed the audio watermark, as described in greater detail below with regard to FIGS. 6-8. For example, the encoder component(s) may be configured to determine Bark-scale values of the media content data in order to calculate scaling factor(s) with which to scale audio watermark data. Using the scaling factor(s), the encoder component(s) may generate scaled watermark data and embed the scaled watermark data in the media content data in order to generate watermarked media content data.

FIGS. 5A-5D illustrate examples of component diagrams for decoding audio watermarks according to embodiments of the present disclosure. As illustrated in FIGS. 5A-5B, the device 110 may include a decoder component 430 configured to detect audio watermarks and the decoder component 430 may be located along an input audio path. For example, the device 110 may include a number of components along the input audio path, such as an N-microphone array 510, a wakeword engine 512, an N-channel adaptive linear acoustic echo canceller (AEC) 514, an N-channel adaptive residual echo suppression 516, an N-channel adaptive beamformer 518, a main beam selector 520, adaptive gain control 522, and/or automatic speech recognition 524.

FIG. 5A illustrates a first example in which the decoder component 530a is included in the wakeword engine 512. For example, as the wakeword engine 512 may process all inbound audio data generated by the microphone array 112, the device 110 may include the decoder component 530a as part of the wakeword engine 512 and may use the decoder component 530a to process all inbound audio data. However, the disclosure is not limited thereto. Instead, FIG. 5B illustrates a second example in which the decoder component 530b is an independent device (e.g., separate from the wakeword engine 512) that receives duplicate copies of the audio data.

While FIGS. 5A-5B illustrate the device 110 including the decoder component 530, the disclosure is not limited thereto. In addition to and/or instead of the device 110 including the decoder component 530, the system 100 may detect audio watermark(s) using decoder(s) located in the system 120. For example, FIG. 5C illustrates the system 120 including a first decoder component 552 that is incorporated into a watermark verification 550 component. In this example, the device 110 may perform real-time audio watermark detection using a local decoder component 530 and the system 120 may verify whether the audio watermarks were accurately detected. For example, the device 110 may send the audio data to the orchestrator 540 and the orchestrator 540 may send the audio data to the watermark verification 550 for decoding.

In some examples, however, instead of including an independent watermark verification 550 component, the system 120 may modify an existing wakeword verification 560 component to include a decoder component 562. For example, the system 120 may already include the wakeword verification 560 component in order to verify whether wakewords are properly detected in the audio data or not. Thus, the orchestrator 540 receives the audio data from the device 110 and automatically sends the audio data to the wakeword verification 560 component. If the wakeword verification 560 component includes the decoder component 562, the wakeword verification X560 component may use the decoder component 562 to detect the audio watermark in the audio data along with verifying whether the wakeword is accurately detected.

As discussed above, in some examples the device 110 may include the decoder component 530 and detect the audio watermark locally. Therefore, the system 120 may include the first decoder component 552 and/or the second decoder component 562 in order to perform oversight by verifying an accuracy of the audio watermark detection. However, the disclosure is not limited thereto and in other examples, the device 110 may not include the decoder component 530 and the system 120 may include the first decoder component 552 and/or the second decoder component 562 and may detect all audio watermarks included in the audio data received from the device 110.

If the system 120 include the decoder component 552 and/or the decoder component 562, the system 120 may detect an audio watermark in the audio data as discussed above. Additionally or alternatively, the system 120 may determine from which device the audio data originated. In some examples, the system 120 may store an indication that the audio watermark was detected in the audio data, including an indication from which particular device the watermarked audio data originated and an indication of which particular device(s) detected the watermarked audio data. Thus, the system 120 may store additional information associated with the generation and transmission of the audio watermark and/or the watermarked audio data. This information may be stored in a user profile, which the system 120 and/or other systems or services can access to provide functionality to the user 5.

As illustrated in FIG. 5D, the device 110 may include a digital signal processor 570 that includes an audio front-end 572 and multiple feature generation processors 574. For example, the multiple feature generation processors 574 may generate Log-Filter Bank Energies (LFBE) feature data 576 (e.g., log-mel filter bank energy feature data), Discrete cosine transform (DCT) feature data 578, and/or other feature data 580.

The feature data may be input to different processors. For example, the LFBE feature data 576 may be input to a wakeword deep neural network (DNN) processor 582, a fingerprint matching processor 584, and/or the like. In contrast, the DCT feature data 578 may be input to a watermark decoding processor 586 to perform watermark decoding.

Figure 6:
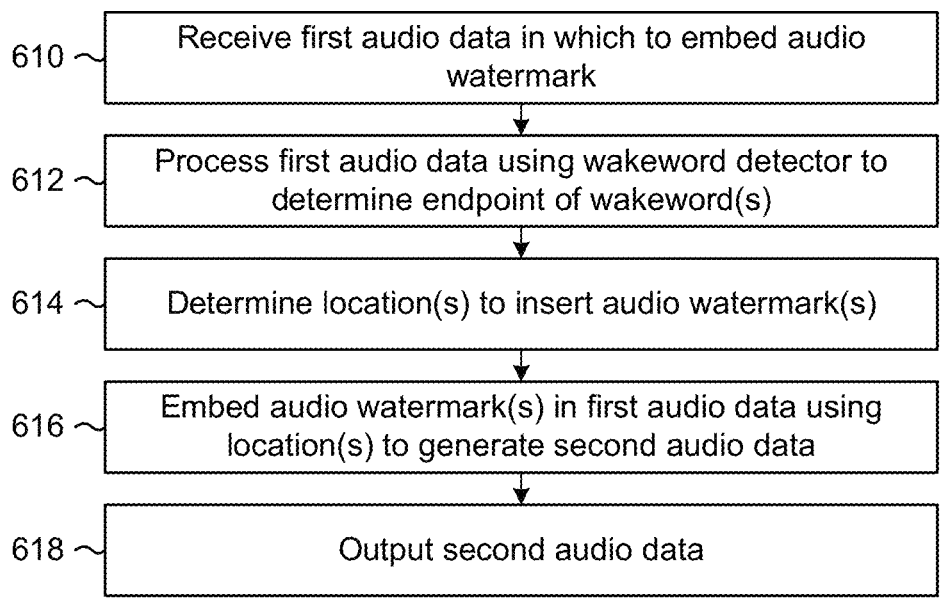
FIG. 6 is a flowchart conceptually illustrating an example method for embedding an audio watermark according to embodiments of the present disclosure.

FIG. 6 is a flowchart conceptually illustrating an example method for embedding an audio watermark according to embodiments of the present disclosure. As illustrated in FIG. 6, the system 100 may receive (610) first audio data in which to embed an audio watermark. For example, the first audio data may correspond to media content, such as a television commercial, a movie, a radio broadcast, and/or the like, although the disclosure is not limited thereto.

The system 100 may process (612) the first audio data using a wakeword detector component to determine an endpoint of wakeword(s) represented in the first audio data and may determine (614) location(s) to insert audio watermark(s) in the first audio data. For example, the system 100 may determine a first endpoint of a first wakeword represented in the first audio data and may determine a first location based on the first endpoint (e.g., 640 ms prior to the first endpoint, although the disclosure is not limited thereto). Similarly, the system 100 may determine a second endpoint of a second wakeword represented in the first audio data and may determine a second location based on the second endpoint.

The system 100 may embed (616) audio watermark(s) in the first audio data using the location(s) to generate second audio data and may (618) output the second audio data. For example, the second audio data may include representation(s) of one or more audio watermarks embedded at the location(s) within the second audio data. As will be described in greater detail below with regard to FIGS. 7-8, the system 100 may dynamically adjust a magnitude of the audio watermarks by determining a scaling factor with which to embed the audio watermarks.

In some examples, the wakeword detector may be configured to detect a single wakeword and each of the endpoints detected in the first audio data correspond to the same wakeword represented at different times within the first audio data. However, the disclosure is not limited thereto, and in other examples the wakeword detector may be configured to detect multiple wakewords without departing from the disclosure. For example, the first wakeword may correspond to a first sound sequence while the second wakeword may correspond to a second sound sequence. Additionally or alternatively, in some examples the system 100 may be configured to insert a single audio watermark and each of the audio watermarks represented in the second audio data correspond to the same audio watermark. However, the disclosure is not limited thereto, and in other examples the system 100 may be configured to insert two or more audio watermarks without departing from the disclosure. For example, the system 100 may insert a first audio watermark corresponding to the first wakeword and insert a second audio watermark corresponding to the second wakeword. Thus, each of the audio watermarks represented in the second audio data may correspond to the particular wakeword in which the audio watermark is embedded, although the disclosure is not limited thereto.

Figure 7:
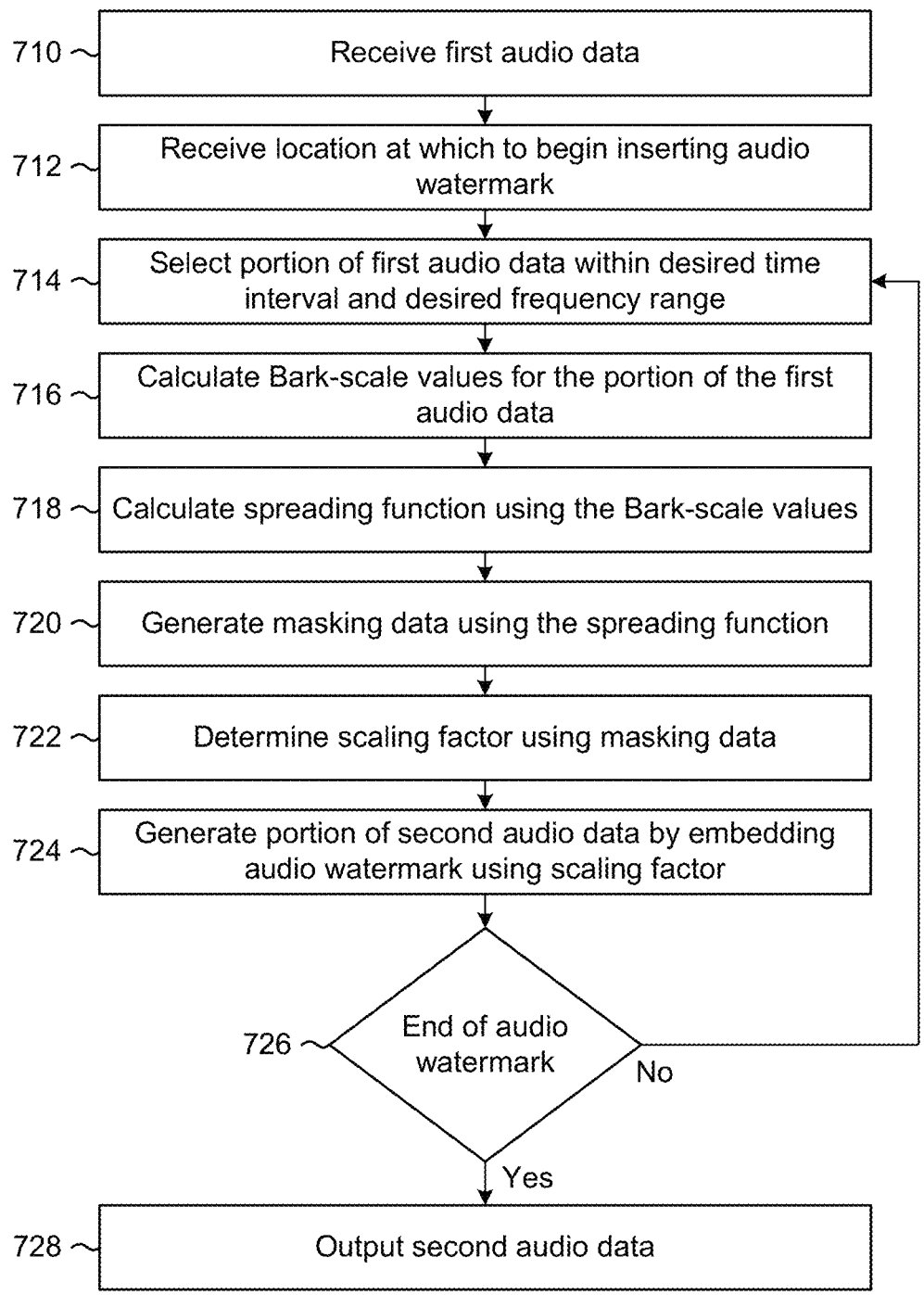
FIG. 7 is a flowchart conceptually illustrating an example method for determining a scaling factor with which to embed an audio watermark according to embodiments of the present disclosure.

FIG. 7 is a flowchart conceptually illustrating an example method for determining a scaling factor with which to embed an audio watermark according to embodiments of the present disclosure. As part of embedding the audio watermark, the system 100 may determine scaling factor data corresponding to the audio watermark. In some examples, the scaling factor data may include a series of scaling factor values corresponding to a series of watermark frames (e.g., segments of the first audio watermark). For example, the system 100 may set the watermark frame length to a first length of time (e.g., 10 ms) and may determine an individual scaling factor value for each segment of the audio watermark corresponding to the first length of time. Thus, the system 100 may select an amplitude of the audio watermark for each audio frame (e.g., 10 ms time interval within the audio data), such that the scaling factor value and corresponding amplitude of the audio watermark may vary over time.

The system 100 may automatically determine the scaling factor data by balancing detectability (e.g., increasing a likelihood that the devices 110 detect the embedded audio watermarks) and perceptibility (e.g., decreasing a likelihood that the audio watermarks are audible to the user 5 and other viewers). In some examples, the system 100 may process the audio data using a spreading formula to determine a spectral mask from the original audio data, which acts as a threshold for the scaling factor data. For example, the spectral mask may indicate an amount of energy perceived in a first frequency range that is caused by energy represented in neighboring frequency ranges. This indicates how much energy can be added to the first frequency range while remaining imperceptible (e.g., inaudible to the user 5). Thus, by selecting scaling factor values that keep an amplitude of the audio watermark below the threshold indicated by the spectral mask, the system 100 may embed the audio watermark in the audio data without the audio watermark being audible to the user 5.

The system 100 may determine the scaling factor data using a watermark frame length (e.g., 10 ms) and may embed the audio watermark within a fixed frequency range (e.g., watermark band). For example, the system 100 may embed the audio watermark between a lower frequency $f_L$ (e.g., 3 kHz) and a higher frequency $f_H$ (e.g., 4 kHz), such that the watermark band is defined by the range $[f_L, f_H]$, although the disclosure is not limited thereto. Thus, the watermark bandwidth W corresponds to the difference between the higher frequency $f_H$ and the lower frequency $f_L$ (e.g., $W=f_H-f_L$). Based on a sampling frequency fs of the audio data, the system 100 may define the frame length in samples as $N=f_sT$, the number of frames in the audio watermark as M, and the number of frequency ranges (e.g., frequency bins associated with discrete cosine transform (DCT) and/or the like) in the watermark band as $L=2WT$. The length N can be identified with the matrix F, which may be assumed to be a unitary normalization so that $FF^T=I$.

The system 100 may consider the N M samples of the audio data that need to be watermarked and divide them into frames, denoted by $x_1(1), \ldots X_N(1), x_1(2), \ldots X_N(2), \ldots x_1(M), \ldots X_N(M)$ and identified with the vectors:

$$x(t) = (x_1(t), \ldots, x_N(t))^T \quad [1]$$

The system 100 may calculate the DCT of each frame as:

$$\hat{x} = Fx \quad [2]$$

The system 100 may refer to the center frequencies of each frequency range (e.g., DCT bin) as:

$$f_i = \frac{(i-1)f_s}{2N} \quad [3]$$

The indices of the first and last frequency range in the watermark band may be represented as:

$$i_L = \frac{2Nf_L}{f_s} \quad [3.1]$$

$$i_H = \frac{2Nf_H}{f_s} \quad [3.2]$$

The system 100 may use a spreading code designed to have a flat spectrum within the watermark band. Thus, the system 100 may define the spreading code in the frequency domain by $s = F^T \hat{s}$, where $s = (\hat{s}_1, \ldots, \hat{s}_N)$ and $$\hat{s}_i = \begin{cases} 1 & i_L \le i \le i_H \\ 0 & \text{otherwise} \end{cases} \quad [4]$$

Given these definitions, each watermarked audio frame is given by:

$$y(t) = x(t) + \sqrt{P(t)} k(t) s \quad [5]$$

where $k(t) \in \{-1, +1\}$ is the key sequence used by the audio watermark and P(t) is the power of the t-th watermark frame, which is chosen according to the perceptual technique described below.

The system 100 may process the audio data to generate first feature vector data representing energy values or power values associated with each of the frequency ranges (e.g., DCT bin frequencies). Using the first feature vector data, the system 100 may generate second feature vector data by calculating Bark-scale values corresponding to the frequency ranges using the approximation:

$$z_i = 13\tan^{-1}(0.00076 f_i) + 3.5\tan^{-1}\left(\left(\frac{f_i}{7500}\right)^2\right) \quad [6]$$

While the first feature vector data corresponds to a first plurality of frequency ranges with a uniform bandwidth (e.g., 0-100 Hz, 100-200 Hz, 200-300 Hz, etc.), the second feature vector data corresponds to a second plurality of frequency ranges that have a varying bandwidth (e.g., 20-100, 100-200, 200-300, 300-400, 400-510, 510-630, etc.). The Bark-scale may be described as a frequency scale in which equal distances correspond with perceptually equal distances. For example, above about 500 Hz the Bark-scale is more or less equal to a logarithmic frequency axis, while below 500 Hz the Bark-scale becomes more linear. The Bark-scale ranges from 1 to 24 and corresponds to the first 24 critical bands of hearing. However, the disclosure is not limited thereto, and the system 100 may generate the second feature vector data using the Mel-scale (e.g., perceptual scale of pitches perceived to be equal in distance) and/or the like without departing from the disclosure.

After generating the second feature vector data representing the Bark-scale values, the system 100 may calculate a spreading function $R_{ij}(t)$, which determines how each frequency component of the audio data spreads to mask nearby frequency ranges. Using Equations [2]-[4], the system 100 may calculate the spreading coefficient values in decibels (dB) as:

$$R_{ij}(t) = (z_i - z_j) \times \begin{cases} 31 & \text{if } i \le j \\ \min\left(-4, -24 - \frac{230}{f_j} + 2\log_{10}(\gamma|\hat{x}_j(t)|^2)\right) & \text{otherwise} \end{cases} \quad [7]$$

where $\gamma = 10^{92/10}$ is a scaling factor for taking digital audio samples, which are scaled to the range [−1, 1], and converting them to a sound pressure level (SPL) given a typical loudspeaker volume and listening distance. Thus, the spreading function $R_{ij}(t)$ gives the relative masking level at frequency range i caused by the energy in frequency range j.

The system 100 may then calculate the masking level (in dB) for each frame as:

$$m_i(t) = \max_j\left[10\log_{10}(|\hat{x}_j(t)|^2) + R_{ij}(t)\right] \quad [8]$$

This gives the energy (in dB) that can be added to the i-th frequency range without being audible to the user 5. Since the spreading code is chosen such that the energy in each frequency range is 0 dB, the power level of the spreading code in a particular frequency range (in dB) is given by:

$$P_{dB}(t) = \min_{i_L \le i \le i_H} m_i(t) \quad [9]$$

The system 100 may convert from decibels to a linear scale to obtain:

$$P(t) = 10^{P_{dB}(t)/10} \quad [10]$$

where P(t) denotes the scaling factor associated with a particular watermark frame. This scaling factor ensures that the level of the spreading code in each frequency range is below the corresponding mask level given by the spectral mask.

As illustrated in FIG. 7, the system 100 may receive (710) first audio data and may receive (712) a location at which to begin inserting an audio watermark. For example, the system 100 may have performed the steps described above with regard to FIG. 6 to determine one or more location(s) to insert the audio watermark by detecting wakeword(s) represented in the first audio data.

The system 100 may select (714) a portion of the first audio data within a desired time interval and a desired frequency range. For example, the portion of the first audio data may correspond to a first time interval (e.g., 10 ms) and a first frequency range (e.g., 3-4 kHz), although the disclosure is not limited thereto. Using the portion of the first audio data, the system 100 may calculate (716) Bark-scale values (e.g., perceptual frequency scale values). For example, the system 100 may generate first feature vector data corresponding to a first plurality of uniform frequency ranges and may apply Equation [6] to generate second feature vector data corresponding to a second plurality of variable frequency ranges.

The system 100 may calculate (718) a spreading function $R_{ij}(t)$ using the Bark-scale values and Equation [7] described above. The system 100 may then generate (720) masking data (e.g., $m_i(t)$) using the spreading function $R_{ij}(t)$ and Equation [8] described above. For example, the system 100 may calculate individual masking levels for each of the frequency ranges and then determine the highest masking level to associate with the frame. The system 100 may determine (722) a scaling factor P(t) using the masking data (e.g., $m_i(t)$) and Equations [9]-[10]. Thus, the system 100 may determine the scaling factor with which to embed the audio watermark within the portion of the first audio data.

The system 100 may generate (724) a portion of second audio data by embedding the audio watermark within the portion of the first audio data using the scaling factor. The system 100 may determine (726) whether this is an end of the audio watermark (e.g., final watermark frame) and, if not, may loop to step 714 and repeat steps 714-724 for an additional time interval within the audio watermark. If the system 100 determines that this is the end of the audio watermark, the system 100 may output (728) the second audio data. For example, the system 100 may store the second audio data in a storage component, may send the second audio data to a remote device and/or a remote system, and/or the like without departing from the disclosure.

Figure 8:
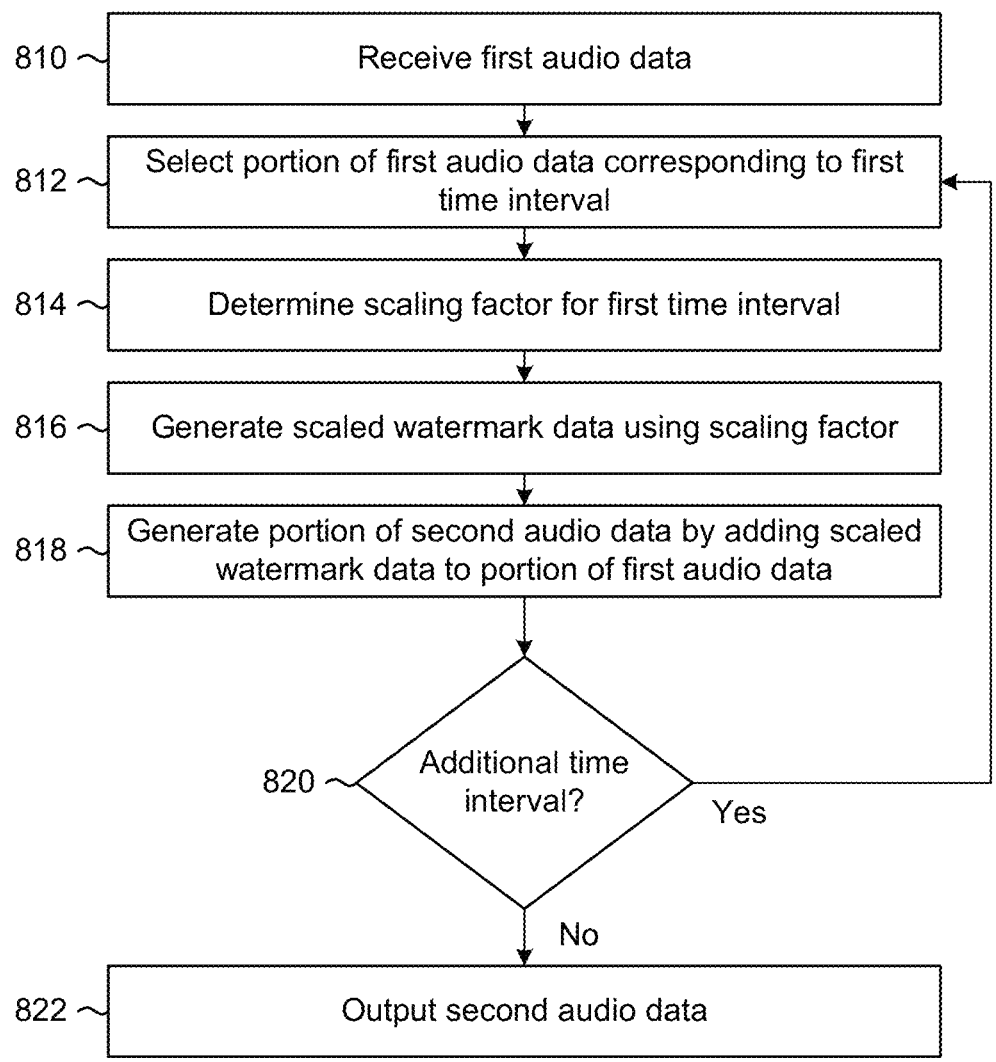
FIG. 8 is a flowchart conceptually illustrating an example method for embedding an audio watermark using a scaling factor according to embodiments of the present disclosure.

FIG. 8 is a flowchart conceptually illustrating an example method for embedding an audio watermark using a scaling factor according to embodiments of the present disclosure. As illustrated in FIG. 8, the system 100 may receive (810) first audio data within which to embed the audio watermark, as described above. For example, the first audio data may correspond to media content, such as a television commercial, a movie, a radio broadcast, and/or the like, although the disclosure is not limited thereto.

The system 100 may select (812) a portion of the first audio data corresponding to a first time interval, may determine (814) a scaling factor for the first time interval, and may generate (816) scaled watermark data using the scaling factor and raw audio watermark data, as described in greater detail above with regard to FIG. 7. The system 100 may generate (818) a portion of second audio data by adding the scaled watermark data to the portion of the first audio data and may determine (820) whether there is an additional time interval. If there is an additional time interval associated with the audio watermark, the system 100 may loop to step 812 and repeat steps 812-818 for the additional time interval. If there is not an additional time interval, the system 100 may output (822) the second audio data. For example, the system 100 may store the second audio data in a storage component, may send the second audio data to a remote device and/or a remote system, and/or the like without departing from the disclosure.

Figure 9:
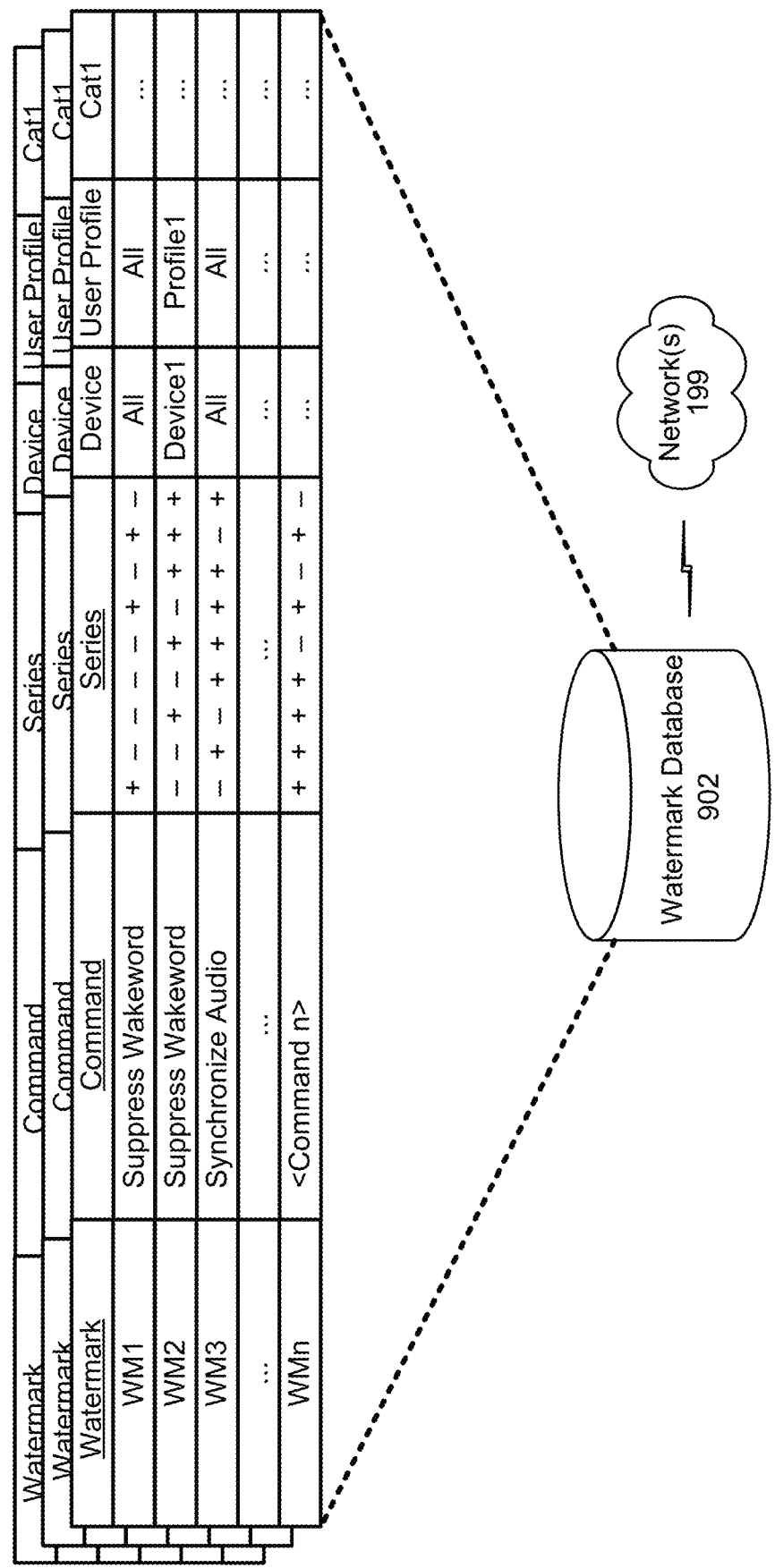
FIG. 9 illustrates data stored and associated with a watermark database according to embodiments of the present disclosure.

FIG. 9 illustrates data stored and associated with a watermark database according to embodiments of the present disclosure. The device 110 and/or the system 120 may include or refer to data regarding watermarks, shown by the watermark database 902 illustrated in FIG. 9. The watermark database 902 may be located on the device 110 and/or proximate to the system 120, although the disclosure is not limited thereto, and/or may otherwise be in communication with various components, for example over the network(s) 199.

The watermark database 902 may include a variety of information related to audio watermarks that are used by the system 100. For illustration, as shown in FIG. 9, the watermark database 902 may include data regarding audio watermarks, such as a name associated with an audio watermark (e.g., WM1-WMn, although the name can vary without departing from the disclosure), a command associated with the audio watermark (e.g., "Suppress wakeword," "Synchronize audio," etc.), a sign series used as a shared key to encode/decode the audio watermark (e.g., a sequence of positive or negative values, such as "+-----+-+-"), a device associated with the audio watermark (e.g., some audio watermarks may be generic to all devices, whereas other audio watermarks may be associated with individual device(s), enabling specific control over a single device), a user profile associated with the audio watermark (e.g., some audio watermarks may be generic to all user profiles, whereas other audio watermarks may be associated with individual user profile(s), enabling specific functionality for a single user profile), and/or the like.

While FIG. 9 illustrates examples of different types of information included within the watermark database 902, the disclosure is not limited thereto. Instead, the watermark database 902 may include additional information not illustrated and/or may not include information illustrated in FIG. 9 without departing from the disclosure. For example, the watermark database 902 may include device identifier (ID) and internet protocol (IP) address information for different devices as well as names by which the devices may be referred to by a user. Further qualifiers describing the devices, a location of the device, commands associated with the device, input capabilities of the device, output capabilities of the device, and/or the like may also be listed in the watermark database 902.

Figure 10:
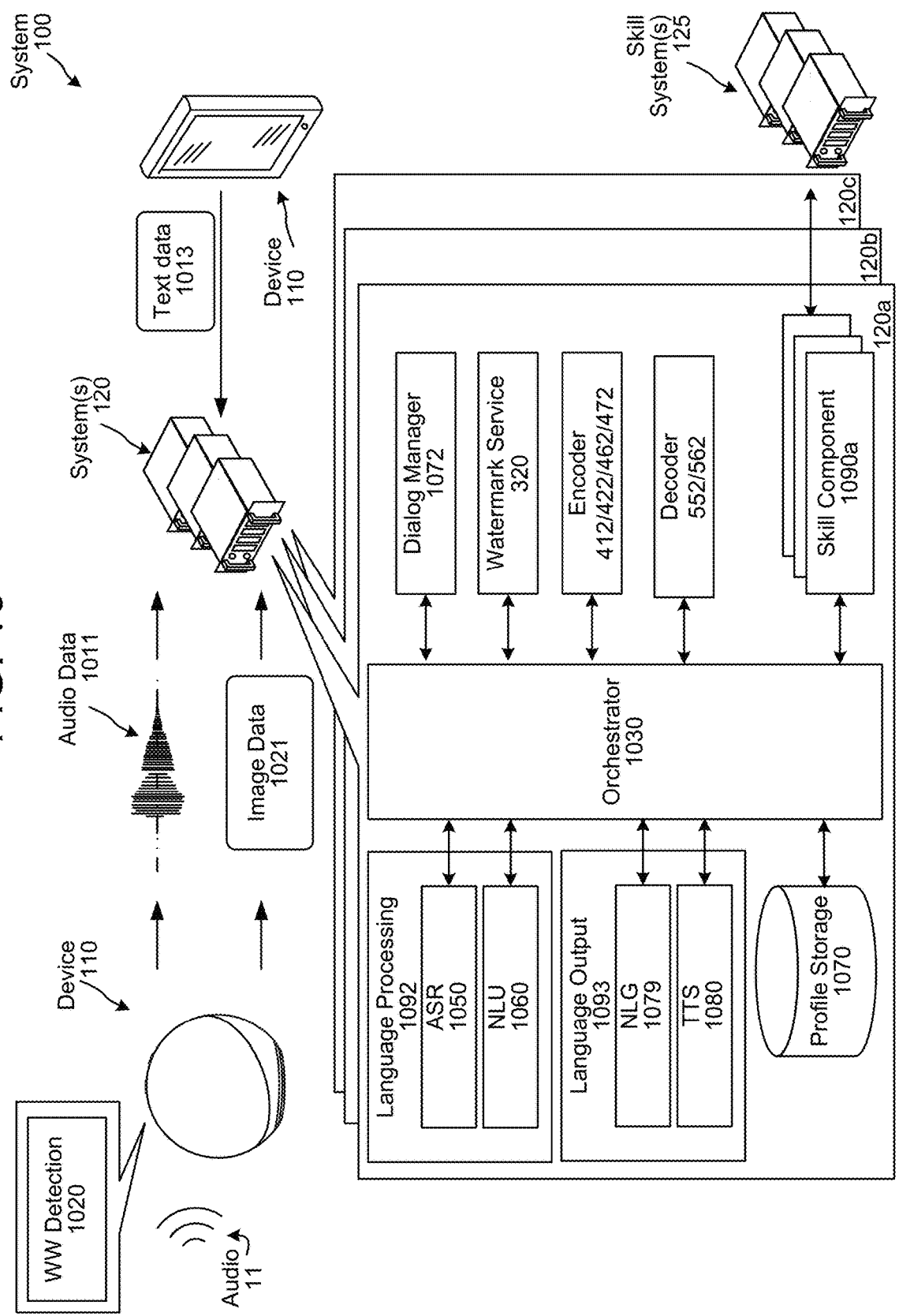
FIG. 10 is a conceptual diagram of components of the system, according to embodiments of the present disclosure.
Figure 11:
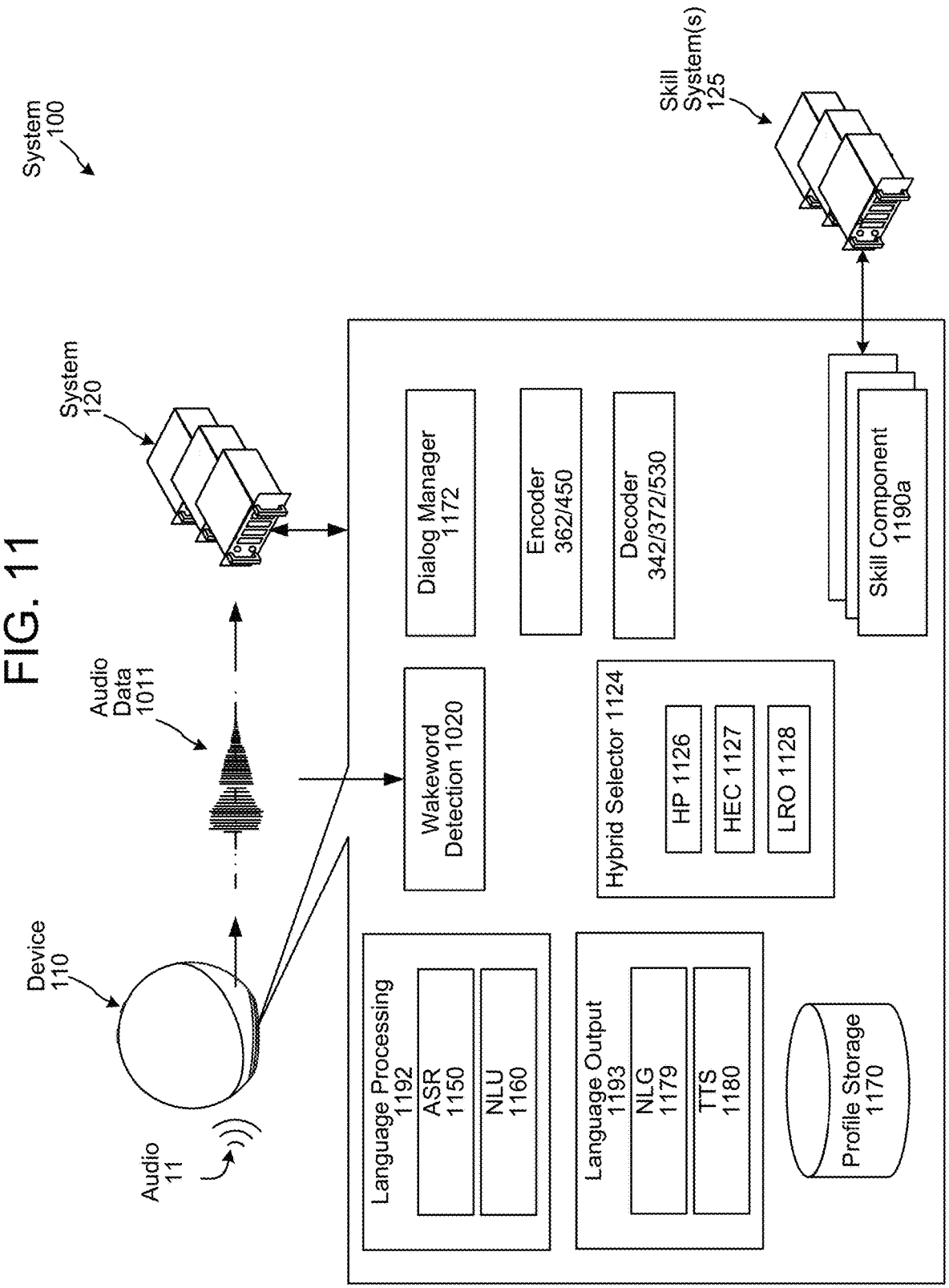
FIG. 11 is a conceptual diagram illustrating components that may be included in a device, according to embodiments of the present disclosure.

The system 100 may operate using various components as described in FIGS. 10 and 11. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may send image data 1021 representing those image(s) to the system 120. The image data 1021 may include raw image data or image data processed by the device 110 before sending to the system 120. The image data 1021 may be used in various manners by different components of the system to perform operations such as determining whether a user is directing an utterance to the system, interpreting a user command, responding to a user command, etc.

The wakeword detector 1020 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1020 and/or input is detected by an input detector, the device 110 may "wake" and begin transmitting audio data 1011, representing the audio 11, to the system(s) 120. The audio data 1011 may include data corresponding to the wakeword; in other embodiments, the portion of the audio corresponding to the wakeword is removed by the device 110 prior to sending the audio data 1011 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 1020 may result in sending audio data to system 120*a* for processing while detection of the wakeword "Computer" by the wakeword detector may result in sending audio data to system 120*b* for processing. The system may have a separate wakeword and system for different skills/systems (e.g., "Dungeon Master" for a game play skill/system 120*c*) and/or such skills/systems may be coordinated by one or more skill(s) 1090 of one or more systems 120.

Upon receipt by the system(s) 120, the audio data 1011 may be sent to an orchestrator component 1030. The orchestrator component 1030 may include memory and logic that enables the orchestrator component 1030 to transmit various pieces and forms of data to various components of the system, as well as perform other operations as described herein.

The orchestrator component 1030 may send the audio data 1011 to a language processing component 1092. The language processing component 1092 (sometimes also referred to as a spoken language understanding (SLU) component) includes an automatic speech recognition (ASR) component 1050 and a natural language understanding (NLU) component 1060. The ASR component 1050 may transcribe the audio data 1011 into text data. The text data output by the ASR component 1050 represents one or more than one (e.g., in the form of an N-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., acoustic units such as phonemes, senons, phones, etc.) and sequences of sounds to identify words that match the sequence of sounds of the speech represented in the audio data 1011. The ASR component 1050 sends the text data generated thereby to an NLU component 1060, via, in some embodiments, the orchestrator component 1030. The text data sent from the ASR component 1050 to the NLU component 1060 may include a single top-scoring ASR hypothesis or may include an N-best list including multiple top-scoring ASR hypotheses. An N-best list may additionally include a respective score associated with each ASR hypothesis represented therein.

The speech processing system 1092 may further include a NLU component 1060. The NLU component 1060 may receive the text data from the ASR component. The NLU component 1060 may attempts to make a semantic interpretation of the phrase(s) or statement(s) represented in the text data input therein by determining one or more meanings associated with the phrase(s) or statement(s) represented in the text data. The NLU component 1060 may determine an intent representing an action that a user desires be performed and may determine information that allows a device (e.g., the device 110, the system(s) 120, a skill component 1090, a skill system(s) 125, etc.) to execute the intent. For example, if the text data corresponds to "play the $5^{th}$ Symphony by Beethoven," the NLU component 1060 may determine an intent that the system output music and may identify "Beethoven" as an artist/composer and "$5^{th}$ Symphony" as the piece of music to be played. For further example, if the text data corresponds to "what is the weather," the NLU component 1060 may determine an intent that the system output weather information associated with a geographic location of the device 110. In another example, if the text data corresponds to "turn off the lights," the NLU component 1060 may determine an intent that the system turn off lights associated with the device 110 or the user 5. However, if the NLU component 1060 is unable to resolve the entity—for example, because the entity is referred to by anaphora such as "this song" or "my next appointment"—the speech processing system 1092 can send a decode request to another speech processing system 1092 for information regarding the entity mention and/or other context related to the utterance. The speech processing system 1092 may augment, correct, or base results data upon the audio data 1011 as well as any data received from the other speech processing system 1092.

The NLU component 1060 may return NLU results data (which may include tagged text data, indicators of intent, etc.) back to the orchestrator 1030. The orchestrator 1030 may forward the NLU results data to a skill component(s) 1090. If the NLU results data includes a single NLU hypothesis, the NLU component 1060 and the orchestrator component 1030 may direct the NLU results data to the skill component(s) 1090 associated with the NLU hypothesis. If the NLU results data includes an N-best list of NLU hypotheses, the NLU component 1060 and the orchestrator component 1030 may direct the top scoring NLU hypothesis to a skill component(s) 1090 associated with the top scoring NLU hypothesis. The system may also include a post-NLU ranker which may incorporate other information to rank potential interpretations determined by the NLU component 1060. The local device 110 may also include its own post-NLU ranker, which may operate similarly to the post-NLU ranker of the remotes system.

A skill component may be software running on the system(s) 120 that is akin to a software application. That is, a skill component 1090 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 1090. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 1090 may operate in conjunction between the system(s) 120 and other devices, such as the device 110, in order to complete certain functions. Inputs to a skill component 1090 may come from speech processing interactions or through other interactions or input sources. A skill component 1090 may include hardware, software, firmware, or the like that may be dedicated to a particular skill component 1090 or shared among different skill components 1090.

A skill support system(s) 125 may communicate with a skill component(s) 1090 within the system(s) 120 and/or directly with the orchestrator component 1030 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 1090 dedicated to interacting with the skill support system(s) 125. Unless expressly stated otherwise, reference to a skill, skill device, or skill component may include a skill component 1090 operated by the system(s) 120 and/or skill operated by the skill support system(s) 125. Moreover, the functionality described herein as a skill or skill may be referred to using many different terms, such as an action, bot, app, or the like. The skill 1090 and or skill support system(s) 125 may return output data to the orchestrator 1030.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 1072 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 1072 may associate a dialog session identifier with the dialog upon identifying that the user is engaging in a dialog with the user. The dialog manager component 1072 may track a user input and the corresponding system generated response to the user input as a turn. The dialog session identifier may correspond to multiple turns of user input and corresponding system generated response. The dialog manager component 1072 may transmit data identified by the dialog session identifier directly to the orchestrator component 1030 or other component. Depending on system configuration the dialog manager 1072 may determine the appropriate system generated response to give to a particular utterance or user input of a turn. Or creation of the system generated response may be managed by another component of the system (e.g., the language output component 1093, NLG 1079, orchestrator 1030, etc.) while the dialog manager 1072 selects the appropriate responses. Alternatively, another component of the system(s) 120 may select responses using techniques discussed herein. The text of a system generated response may be sent to a TTS component 1080 for creation of audio data corresponding to the response. The audio data may then be sent to a user device (e.g., device 110) for ultimate output to the user. Alternatively (or in addition) a dialog response may be returned in text or some other form.

The dialog manager 1072 may receive the ASR hypothesis/hypotheses (i.e., text data) and make a semantic interpretation of the phrase(s) or statement(s) represented therein. That is, the dialog manager 1072 determines one or more meanings associated with the phrase(s) or statement(s) represented in the text data based on words represented in the text data. The dialog manager 1072 determines a goal corresponding to an action that a user desires be performed as well as pieces of the text data that allow a device (e.g., the device 110, the system(s) 120, a skill 1090, a skill system(s) 125, etc.) to execute the intent. If, for example, the text data corresponds to "what is the weather," the dialog manager 1072 may determine that that the system(s) 120 is to output weather information associated with a geographic location of the device 110. In another example, if the text data corresponds to "turn off the lights," the dialog manager 1072 may determine that the system(s) 120 is to turn off lights associated with the device(s) 110 or the user(s) 5.

The dialog manager 1072 may send the results data to one or more skill(s) 1090. If the results data includes a single hypothesis, the orchestrator component 1030 may send the results data to the skill(s) 1090 associated with the hypothesis. If the results data includes an N-best list of hypotheses, the orchestrator component 1030 may send the top scoring hypothesis to a skill(s) 1090 associated with the top scoring hypothesis.

The system 120 includes a language output component 1093. The language output component 1093 includes a natural language generation (NLG) component 1079 and a text-to-speech (TTS) component 1080. The NLG component 1079 can generate text for purposes of TTS output to a user. For example the NLG component 1079 may generate text corresponding to instructions corresponding to a particular action for the user to perform. The NLG component 1079 may generate appropriate text for various outputs as described herein. The NLG component 1079 may include one or more trained models configured to output text appropriate for a particular input. The text output by the NLG component 1079 may become input for the TTS component 1080. Alternatively or in addition, the TTS component 1080 may receive text data from a skill 1090 or other system component for output.

The NLG component 1079 may include a trained model. The NLG component 1079 generates text data from dialog data received by the dialog manager 1072 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1080.

The TTS component 1080 may generate audio data (e.g., synthesized speech) from text data using one or more different methods. Text data input to the TTS component 1080 may come from a skill component 1090, the orchestrator component 1030, or another component of the system. In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 1011 representing the commands to the system(s) 120 for processing, after which the system(s) 120 may return output data that can cause the device 110 to engage its camera.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 10 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 11 illustrates such a configured device 110. Although not necessarily repeated in FIGS. 10 and 11, the device 110 and system 120 may also include the components and functionality described above, for example with reference to FIGS. 3A-5D.

While the disclosure is not limited thereto, FIG. 10 illustrates an example in which the system(s) 120 may include encoder component(s) 412/422/462/472 and/or decoder component(s) 552/562. For example, the system(s) 120 may include the encoder component 322 illustrated in FIG. 3A, the encoder component(s) 412/422 illustrated in FIG. 4A, the encoder component(s) 462/472 illustrated in FIG. 4C, the decoder component(s) 552/562 illustrated in FIG. 5C, a combination thereof, and/or the like without departing from the disclosure. Similarly, FIG. 11 illustrates an example in which the device 110 may include encoder component(s) 362/450 and/or decoder component(s) 342/372/530 without departing from the disclosure. For example, the device 110 may include the encoder component 362 illustrated in FIG. 3B, the encoder component 450 illustrated in FIG. 4B, the decoder component 342 illustrated in FIG. 3A, the decoder component 372 illustrated in FIG. 3B, the decoder component 530 illustrated in FIGS. 5A-5B, a combination thereof, and/or the like without departing from the disclosure.

In at least some embodiments, the system 120 may receive the audio data 1011 from the device 110, to recognize speech corresponding to a spoken input in the received audio data 1011, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 1180) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 10, the device 110 may include a wakeword detection component 1020 configured to compare the audio data 1011 to stored models used to detect a wakeword (e.g., "Alexa") that indicates to the device 110 that the audio data 1011 is to be processed for determining NLU output data (e.g., slot data that corresponds to a named entity, label data, and/or intent data, etc.). In at least some embodiments, a hybrid selector 1124, of the device 110, may send the audio data 1011 to the wakeword detection component 1020. If the wakeword detection component 1020 detects a wakeword in the audio data 1011, the wakeword detection component 1020 may send an indication of such detection to the hybrid selector 1124. In response to receiving the indication, the hybrid selector 1124 may send the audio data 1011 to the system 120 and/or the ASR component 1150. The wakeword detection component 1020 may also send an indication, to the hybrid selector 1124, representing a wakeword was not detected. In response to receiving such an indication, the hybrid selector 1124 may refrain from sending the audio data 1011 to the system 120, and may prevent the ASR component 1150 from further processing the audio data 1011. In this situation, the audio data 1011 can be discarded.

The device 110 may conduct its own speech processing using on-device language processing components, such as an SLU/language processing component 1192 (which may include an ASR component 1150 and an NLU 1160), similar to the manner discussed herein with respect to the SLU component 1092 (or ASR component 1050 and the NLU component 1060) of the system 120. Language processing component 1192 may operate similarly to language processing component 1092, ASR component 1150 may operate similarly to ASR component 1050 and NLU component 1160 may operate similarly to NLU component 1060. The device 110 may also internally include, or otherwise have access to, other components such as one or more skill components 1190 capable of executing commands based on NLU output data or other results determined by the device 110/system 120 (which may operate similarly to skill components 1090), profile storage 1170 (configured to store similar profile data to that discussed herein with respect to the profile storage 1070 of the system 120), or other components. In at least some embodiments, the profile storage 1170 may only store profile data for a user or group of users specifically associated with the device 110. Similar to as described above with respect to skill component 1090, a skill component 1190 may communicate with a skill system(s) 125. The device 110 may also have its own language output component 1193 which may include NLG component 1179 and TTS component 1180. Language output component 1193 may operate similarly to language processing component 1093, NLG component 1179 may operate similarly to NLG component 1079 and TTS component 1180 may operate similarly to TTS component 1080.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 1124, of the device 110, may include a hybrid proxy (HP) 1126 configured to proxy traffic to/from the system 120. For example, the HP 1126 may be configured to send messages to/from a hybrid execution controller (HEC) 1127 of the hybrid selector 1124. For example, command/directive data received from the system 120 can be sent to the HEC 1127 using the HP 1126. The HP 1126 may also be configured to allow the audio data 1011 to pass to the system 120 while also receiving (e.g., intercepting) this audio data 1011 and sending the audio data 1011 to the HEC 1127.

In at least some embodiments, the hybrid selector 1124 may further include a local request orchestrator (LRO) 1128 configured to notify the ASR component 1150 about the availability of new audio data 1011 that represents user speech, and to otherwise initiate the operations of local language processing when new audio data 1011 becomes available. In general, the hybrid selector 1124 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1011 is received, the HP 1126 may allow the audio data 1011 to pass through to the system 120 and the HP 1126 may also input the audio data 1011 to the on-device ASR component 1150 by routing the audio data 1011 through the HEC 1127 of the hybrid selector 1124, whereby the LRO 1128 notifies the ASR component 1150 of the audio data 1011. At this point, the hybrid selector 1124 may wait for response data from either or both of the system 120 or the local language processing components. However, the disclosure is not limited thereto, and in some examples the hybrid selector 1124 may send the audio data 1011 only to the local ASR component 1150 without departing from the disclosure. For example, the device 110 may process the audio data 1011 locally without sending the audio data 1011 to the system 120.

The local ASR component 1150 is configured to receive the audio data 1011 from the hybrid selector 1124, and to recognize speech in the audio data 1011, and the local NLU component 1160 is configured to determine a user intent from the recognized speech, and to determine how to act on the user intent by generating NLU output data which may include directive data (e.g., instructing a component to perform an action). Such NLU output data may take a form similar to that as determined by the NLU component 1060 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 1160) may be selected as usable to respond to a natural language user input, and local response data may be sent (e.g., local NLU output data, local knowledge base information, internet search results, and/or local directive data) to the hybrid selector 1124, such as a "ReadyToExecute" response. The hybrid selector 1124 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 1011 to the system 120, and the response data from the system 120 may include the unique identifier to identify which natural language user input the response data corresponds.

In at least some embodiments, the device 110 may include, or be configured to use, one or more skill components 1190 that may work similarly to the skill component(s) 1090 implemented by the system 120. The skill component(s) 1190 may correspond to one or more domains that are used in order to determine how to act on a spoken input in a particular way, such as by outputting a directive that corresponds to the determined intent, and which can be processed to implement the desired operation. The skill component(s) 1190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 1190, a skill system 125, or a combination of a skill component 1190 and a corresponding skill system 125.

Similar to the manner discussed with regard to FIG. 10, the local device 110 may be configured to recognize multiple different wakewords and/or perform different categories of tasks depending on the wakeword. Such different wakewords may invoke different processing components of local device 110 (not illustrated in FIG. 11). For example, detection of the wakeword "Alexa" by the wakeword detector 1020 may result in sending audio data to certain language processing components 1192/skills 1190 for processing while detection of the wakeword "Computer" by the wakeword detector may result in sending audio data different language processing components 1192/skills 1190 for processing.

As described in greater detail above with regard to FIGS. 3A-5D, the device 110 and/or the system 120 may include an encoder component configured to embed an audio watermark and/or a decoder component configured to detect the audio watermark. For example, the encoder component may be included in the TTS component in the system 120, in a separate component associated with the system 120, in a separate component associated with the skill system(s) 125, in a separate component associated with the device 110, and/or the like without departing from the disclosure. Thus, the device 110, the system 120, and/or the skill system(s) 125 may be configured to generate watermarked audio data by embedding the audio watermark using the encoder component.

Similarly, the decoder component may be included within the wakeword detection component 1020 in the device 110, in a separate component associated with the device 110, in a separate component associated with the system 120, in a separate component associated with the skill system(s) 125, and/or the like without departing from the disclosure. Thus, the device 110, the system 120, and/or the skill system(s) 125 may be configured to detect an audio watermark embedded in watermarked audio data using the decoder component.

Figure 12:
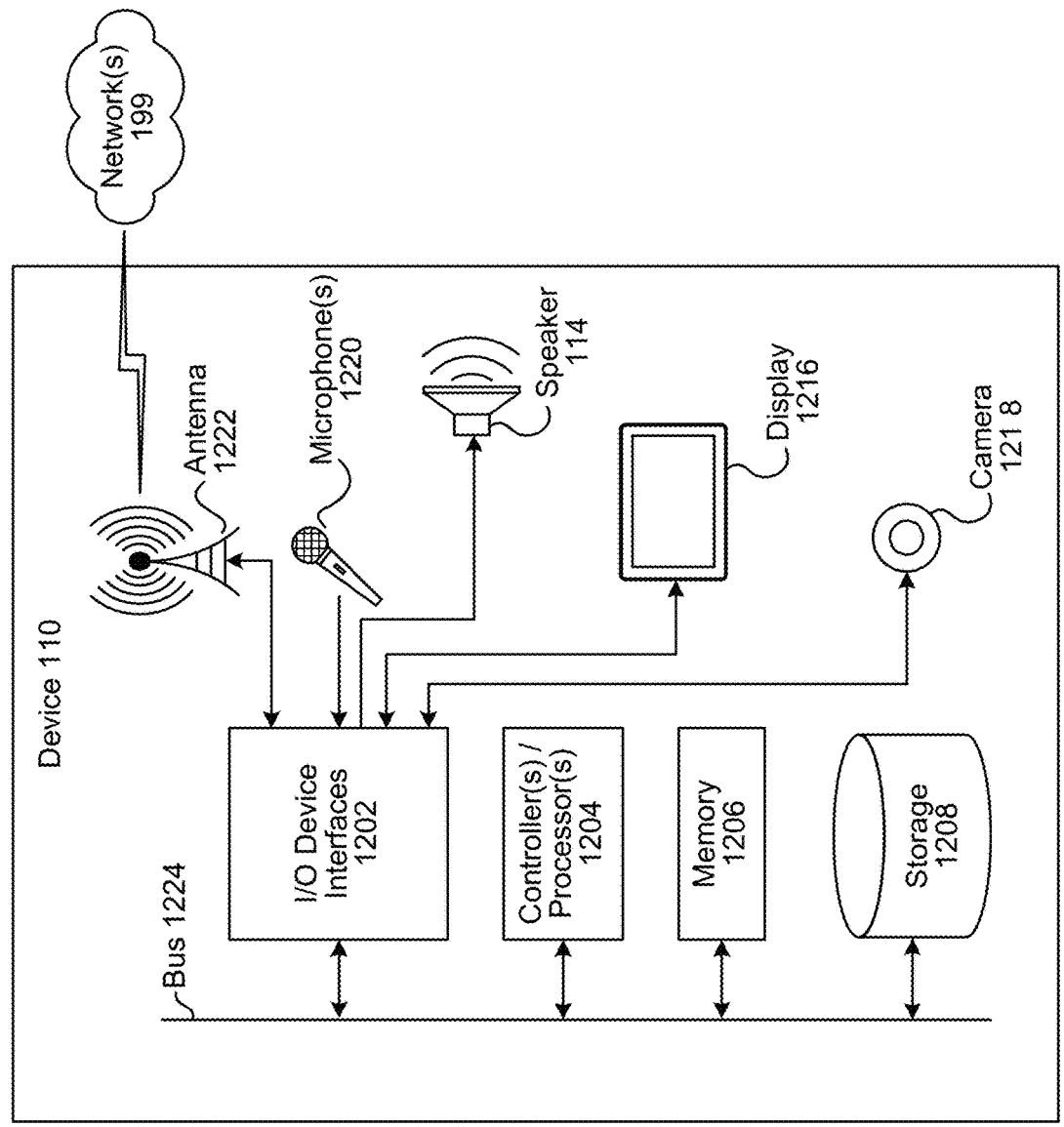
FIG. 12 is a block diagram conceptually illustrating example components of a device, according to embodiments of the present disclosure.
Figure 13:
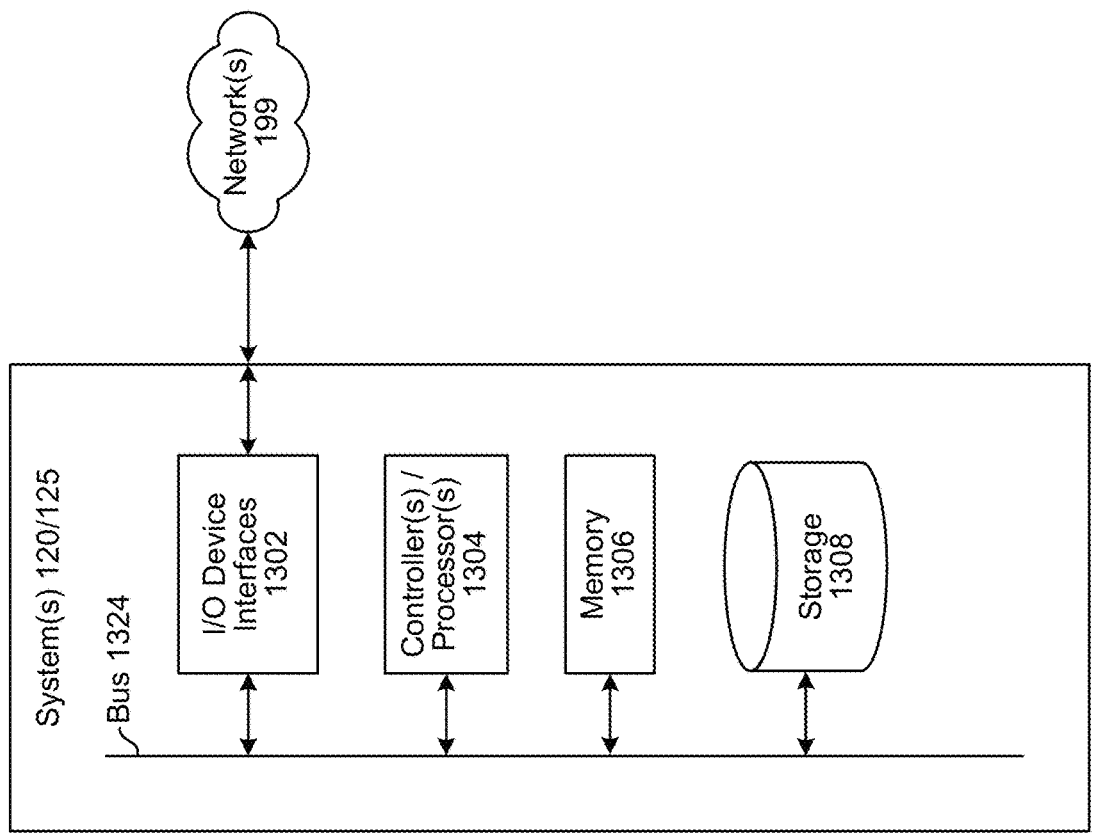
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device.

Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 114, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1202/1302), processor(s) (1204/1304), memory (1206/1306), and/or storage (1208/1308) of the device(s) 110, natural language command processing system 120, or the skill system 125, respectively. Thus, the ASR component 1050 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110.

For example, language processing 1092/1192 (which may include ASR 1050/1150), language output 1093/1193 (which may include NLG 1079/1179 and TTS 1080/1180), etc., for example as illustrated in FIGS. 10 and 11. Unless expressly noted otherwise, the system version of such components may operate similarly to the device version of such components and thus the description of one version (e.g., the system version or the local version) applies to the description of the other version (e.g., the local version or system version) and vice-versa.

Figure 14:
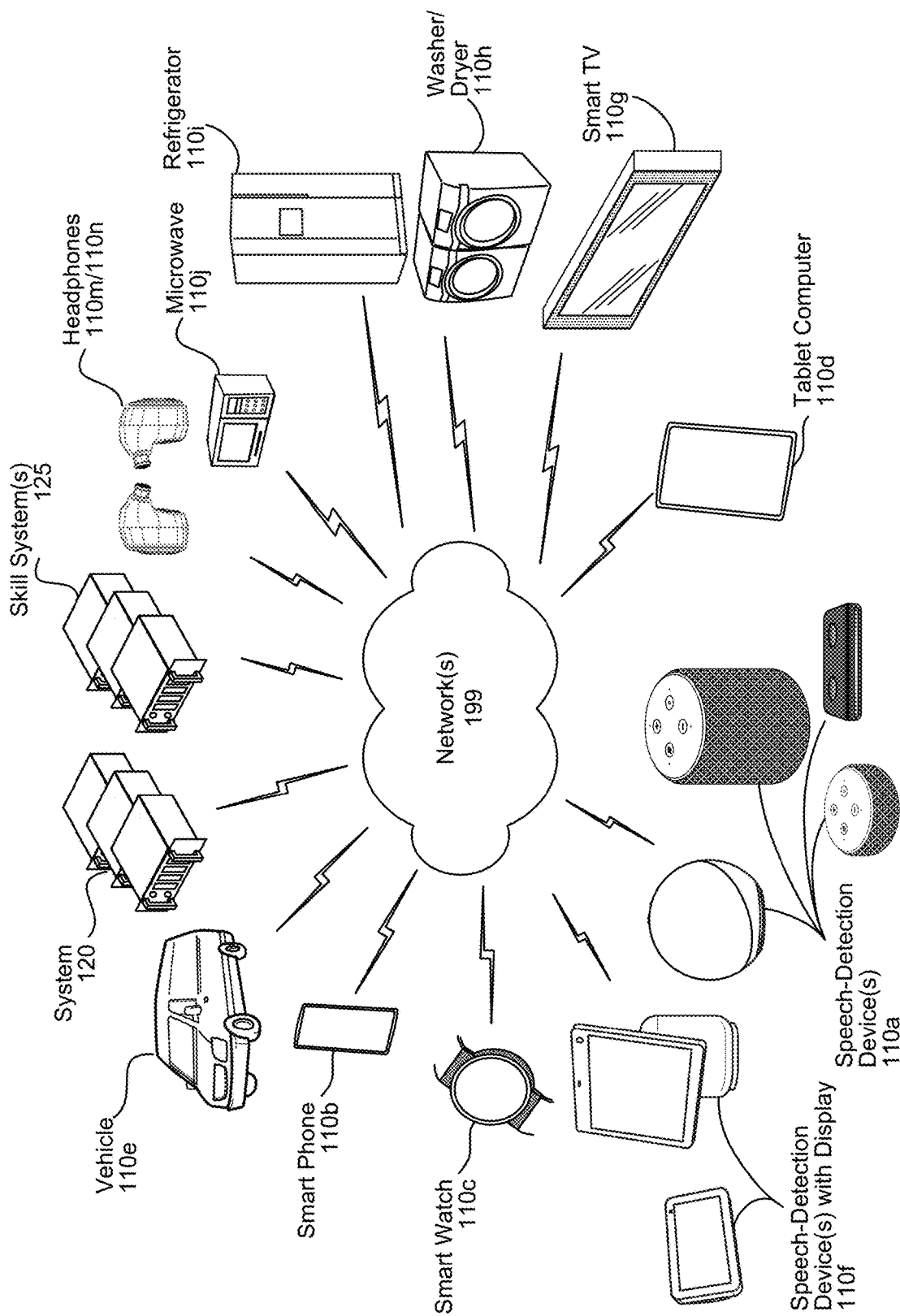
FIG. 14 illustrates an example of a computer network for use with the overall system, according to embodiments of the present disclosure.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1050, the NLU component 1060, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data;
   determining that a wakeword is represented in a first portion of the first audio data;
   determining to insert an audio watermark in the first portion of the first audio data;
   determining first feature vector data corresponding to the first audio data, the first feature vector data including:
      a first power value associated with the first audio data and a first frequency range, and
      a second power value associated with the first audio data and a second frequency range;
   determining a first coefficient value associated with the first frequency range, wherein the first coefficient value is determined based on the second frequency range;
   determining, using the first feature vector data and the first coefficient value, a first mask value representing a highest energy associated with the first frequency range;
   determining, using the first feature vector data, a second mask value representing a highest energy associated with the second frequency range;
   determining that the first mask value is less than the second mask value;
   determining, using the first mask value, a first value corresponding to a first portion of the audio watermark; and
   generating, using the first value, a second portion of second audio data by embedding the first portion of the audio watermark in the first portion of the first audio data.

2. The computer-implemented method of claim 1, wherein determining the first mask value further comprises:
   determining, using the second power value and the first coefficient value, the first mask value;
   determining, using a third power value and a second coefficient value, a third mask value associated with the first frequency range, the third power value associated with the first audio data and a third frequency range, the second coefficient value associated with the first frequency range and determined based on the third frequency range; and
   determining that the first mask value is greater than the third mask value.

3. The computer-implemented method of claim 1, further comprising:
   determining a second coefficient value;
   determining, using the first feature vector data and the second coefficient value, a third mask value representing a highest energy associated with the first frequency range;
   determining, using the first feature vector data, a fourth mask value representing a highest energy associated with the second frequency range;
   determining that the fourth mask value is less than the third mask value;
   determining, using the fourth mask value, a second value corresponding to a second portion of the audio watermark; and generating, using the second value, a third portion of the second audio data by embedding the second portion of the audio watermark in a second portion of the first audio data.

4. A computer-implemented method, the method comprising:
receiving first audio data;
receiving a first indication to send a first command, via one or more loudspeakers of a first device, to one or more second devices in proximity to the first device:
selecting, based on the first command, an audio watermark, wherein the audio watermark corresponds to a second indication that instructs the one or more second devices to perform an action corresponding to the first command:
determining first feature vector data corresponding to the first audio data, the first feature vector data including:
a first power value associated with the first audio data and a first frequency range, and
a second power value associated with the first audio data and a second frequency range;
determining a first coefficient value associated with the first frequency range, wherein the first coefficient value is determined based on the second frequency range;
determining, using the first coefficient value and the first feature vector data, a first value corresponding to a first portion of the audio watermark; and
generating, using the first value, a second portion of second audio data by embedding the first portion of the audio watermark in a first portion of the first audio data.

5. The computer-implemented method of claim 4, further comprising:
determining, using the first feature vector data, a second coefficient value;
determining, using the second coefficient value and the first feature vector data, a second value corresponding to a second portion of the audio watermark; and
generating, using the second value, a third portion of the second audio data by embedding the second portion of the audio watermark in a second portion of the first audio data.

6. The computer-implemented method of claim 4, wherein determining the first value further comprises:
determining, using the second power value and the first coefficient value, a first mask value associated with the first frequency range, the first mask value determined based on the second frequency range;
determining, using a third power value and a second coefficient value, a second mask value associated with the first frequency range, the third power value associated with the first audio data and a third frequency range, the second coefficient value associated with the first frequency range and determined based on the third frequency range;
determining that the first mask value is greater than the second mask value; and
determining the first value using the first mask value.

7. The computer-implemented method of claim 4, wherein determining the first value further comprises:
determining, using the first feature vector data and a plurality of coefficient values, a first plurality of mask values associated with the first frequency range;
determining that a first mask value is highest of the first plurality of mask values;
determining, using the first feature vector data and the plurality of coefficient values, a second plurality of mask values corresponding to the second frequency range;
determining that a second mask value is highest of the second plurality of mask values;
determining that the first mask value is less than the second mask value; and
determining the first value using the first mask value.

8. The computer-implemented method of claim 4, wherein determining the first value further comprises:
determining, using the first feature vector data and a plurality of coefficient values, a plurality of mask values including a first mask value corresponding to the first frequency range and a second mask value corresponding to the second frequency range;
determining that the first mask value is a lowest value of the plurality of mask values; and
determining the first value using the first mask value.

9. The computer-implemented method of claim 4, wherein determining the first coefficient value further comprises:
determining a first Bark-scale value associated with the first frequency range;
determining a second Bark-scale value associated with the second frequency range;
determining a difference value between the first Bark-scale value and the second Bark-scale value; and
determining the first coefficient value using the difference value.

10. The computer-implemented method of claim 4, further comprising:
detecting a representation of a wakeword in a second portion of the first audio data;
selecting, based on detecting the representation of the wakeword, a second audio watermark; and
determining to insert the second audio watermark in the second portion of the first audio data.

11. The computer-implemented method of claim 4, further comprising:
generating, by the first device, output audio using the second audio data;
generating, by a second device, third audio data including a representation of the output audio;
determining, by the second device, that the third audio data includes a representation of the audio watermark;
determining the first command corresponding to the audio watermark; and
performing the action corresponding to the first command.

12. The computer-implemented method of claim 4, further comprising:
generating, by the first device, output audio using the second audio data;
generating, by a second device, third audio data including a representation of the output audio;
detecting, by the second device, a representation of a wakeword in the third audio data;
determining, by the second device, that the third audio data includes a representation of the audio watermark;
determining, by the second device, that the audio watermark corresponds to an indication to ignore the representation of the wakeword; and
determining to ignore the representation of the wakeword in the third audio data.

13. A system comprising:
at least one processor; and
memory including instructions operable to be executed by the at least one processor to cause the system to:
receive first audio data;
determine to insert an audio watermark in the first audio data;
determine first feature vector data corresponding to the first audio data, the first feature vector data including:
a first power value associated with the first audio data and a first frequency range, and
a second power value associated with the first audio data and a second frequency range;
determine a first coefficient value associated with the first frequency range, wherein the first coefficient value is determined based on the second frequency range;
determine, using the first feature vector data and a first plurality of coefficient values, a first plurality of mask values including a first mask value corresponding to the first frequency range and a second mask value corresponding to the second frequency range;
determine that the first mask value is a lowest value of the first plurality of mask values;
determine, using the first coefficient value, the first mask value, and the first feature vector data, a first value corresponding to a first portion of the audio watermark; and
generate, using the first value, a second portion of second audio data by embedding the first portion of the audio watermark in a first portion of the first audio data.

14. The system of claim 13, wherein the memory further comprises instructions that, when executed by the at least one processor, further cause the system to:
determine, using the first feature vector data, a second coefficient value;
determine, using the second coefficient value and the first feature vector data, a second value corresponding to a second portion of the audio watermark; and
generate, using the second value, a third portion of the second audio data by embedding the second portion of the audio watermark in a second portion of the first audio data.

15. The system of claim 13, wherein the memory further comprises instructions that, when executed by the at least one processor, further cause the system to:
determine, using the second power value and the first coefficient value, the first mask value associated with the first frequency range, the first mask value determined based on the second frequency range;
determine, using a third power value and a second coefficient value, a third mask value associated with the first frequency range, the third power value associated with the first audio data and a third frequency range, the second coefficient value associated with the first frequency range and determined based on the third frequency range;
determine that the first mask value is greater than the third mask value; and
determine the first value using the first mask value.

16. The system of claim 13, wherein the memory further comprises instructions that, when executed by the at least one processor, further cause the system to:
determine, using the first feature vector data and the first plurality of coefficient values, a second plurality of mask values associated with the first frequency range;
determine that the first mask value is highest of the second plurality of mask values;
determine, using the first feature vector data and the first plurality of coefficient values, a third plurality of mask values corresponding to the second frequency range;
determine that a third mask value is highest of the third plurality of mask values;
determine that the first mask value is less than the third mask value; and
determine the first value using the first mask value.

17. The system of claim 13, wherein the memory further comprises instructions that, when executed by the at least one processor, further cause the system to:
detect a representation of a wakeword in a first portion of the first audio data;
select, based on detecting the representation of the wakeword, the audio watermark; and
determine to insert the audio watermark in the first portion of the first audio data.

18. The system of claim 13, wherein the memory further comprises instructions that, when executed by the at least one processor, further cause the system to:
receive a first indication to send a first command, via one or more loudspeakers of a first device, to one or more second devices in proximity to the first device; and
select, based on the first command, the audio watermark, wherein the audio watermark corresponds to a second indication that instructs the one or more second devices to perform an action corresponding to the first command.

19. The system of claim 13, wherein the memory further comprises instructions that, when executed by the at least one processor, further cause the system to:
generate, by a first device, output audio using the second audio data;
generate, by a second device, third audio data including a representation of the output audio;
determine, by the second device, that the third audio data includes a representation of the audio watermark;
determine a command corresponding to the audio watermark; and
perform an action corresponding to the command.

20. The system of claim 13, wherein the memory further comprises instructions that, when executed by the at least one processor, further cause the system to:
generate, by a first device, output audio using the second audio data;
generate, by a second device, third audio data including a representation of the output audio;
detect, by the second device, a representation of a wakeword in the third audio data;
determine, by the second device, that the third audio data includes a representation of the audio watermark;
determine, by the second device, that the audio watermark corresponds to an indication to ignore the representation of the wakeword; and
determine to ignore the representation of the wakeword in the third audio data.

* * * * *